(12) United States Patent
Umeno et al.

(10) Patent No.: US 11,485,325 B2
(45) Date of Patent: Nov. 1, 2022

(54) VEHICLE WIPER DEVICE

(71) Applicants: DENSO CORPORATION, Kariya (JP); KABUSHIKI KAISHA TOKAI RIKI CO., LTD., Obu (JP)

(72) Inventors: Takashi Umeno, Kosai (JP); Taku Ogura, Obu (JP)

(73) Assignees: DENSO CORPORATION, Kariya (JP); KABUSHIKI KAISHA TOKAI RIKI CO., LTD., Obu (JP)

( * ) Notice: Subject to any disclaimer, the term of this patent is extended or adjusted under 35 U.S.C. 154(b) by 0 days.

(21) Appl. No.: 17/342,914

(22) Filed: Jun. 9, 2021

(65) Prior Publication Data

US 2021/0323507 A1    Oct. 21, 2021

Related U.S. Application Data

(62) Division of application No. 16/099,678, filed as application No. PCT/JP2017/018753 on May 18, 2017, now Pat. No. 11,254,290.

(30) Foreign Application Priority Data

May 18, 2016 (JP) ................................ 2016-099657
May 24, 2016 (JP) ................................ 2016-103528
May 25, 2016 (JP) ................................ 2016-104671

(51) Int. Cl.
*B60S 1/34* (2006.01)
*B60S 1/52* (2006.01)
(Continued)

(52) U.S. Cl.
CPC .......... *B60S 1/3415* (2013.01); *B60S 1/3429* (2013.01); *B60S 1/3431* (2013.01); *B60S 1/3447* (2013.01);
(Continued)

(58) Field of Classification Search
CPC .......... B60S 1/522; B60S 1/52; B60S 1/3447; B60S 1/3415; B60S 1/3425; B60S 1/0408; B60S 1/34; B60S 1/3431; B60S 1/3429
(Continued)

(56) References Cited

U.S. PATENT DOCUMENTS 5,564,158 A * 10/1996 Bauer ................... B60S 1/3434
  15/250.31
5,661,870 A    9/1997 Eustache et al.
(Continued)

FOREIGN PATENT DOCUMENTS

DE    2842233    * 4/1980
DE    3909165    * 10/1989
(Continued)

OTHER PUBLICATIONS

Machine translation of description portion of German publication 2842233, published Apr. 1980. (Year: 1980).*
(Continued)

*Primary Examiner* — Gary K. Graham
(74) *Attorney, Agent, or Firm* — Solaris Intellectual Property Group, PLLC

(57) ABSTRACT

A vehicle wiper device includes a wiper arm, a wiper blade, a nozzle body, a hose, and a cleaning fluid supply section. A leading end side portion of the wiper arm is configured by an arm piece, and the wiper arm swings back and forth. The nozzle body is attached to the arm piece, is disposed on an outward movement side of the wiper blade, and jets cleaning fluid toward a windshield. The hose conveys cleaning fluid under pressure. The cleaning fluid supply section is at an opposite side of a rubber holder from the windshield, extends from the nozzle body so as to extend across the rubber holder from the outward movement side toward a
(Continued)

return movement side of the wiper blade, is connected to the hose, and supplies cleaning fluid to the nozzle body.

6 Claims, 21 Drawing Sheets

(51) Int. Cl.
*B60S 1/46* (2006.01)
*B60S 1/40* (2006.01)

(52) U.S. Cl.
CPC ................ *B60S 1/52* (2013.01); *B60S 1/522* (2013.01); *B60S 1/4006* (2013.01)

(58) Field of Classification Search
USPC ........................................ 15/250.04, 250.351
See application file for complete search history.

(56) References Cited

U.S. PATENT DOCUMENTS

| | | | |
|---|---|---|---|
| 6,286,174 | B1 | 9/2001 | Zimmer |
| 6,393,652 | B1 | 5/2002 | Vogt |
| 6,836,924 | B2 | 1/2005 | Egan-Walter |
| 2003/0009841 | A1* | 1/2003 | Sato ................. B60S 1/3415 15/250.04 |
| 2015/0113754 | A1* | 4/2015 | Umeno ................ B60S 1/482 15/250.04 |
| 2015/0274127 | A1 | 10/2015 | Burkard et al. |
| 2016/0096510 | A1 | 4/2016 | Grasso et al. |
| 2016/0121853 | A1* | 5/2016 | Uchiyama ............ B60S 1/3468 15/250.04 |
| 2017/0080903 | A1 | 3/2017 | Kiyama et al. |

FOREIGN PATENT DOCUMENTS

| | | |
|---|---|---|
| EP | 3002166 A1 | 4/2016 |
| JP | S51-121933 U | 10/1976 |
| JP | H06-33763 U | 5/1994 |
| JP | 2002-370625 A | 12/2002 |
| JP | 2003-25968 A | 1/2003 |
| JP | 2003-341484 A | 12/2003 |
| JP | 2006-7971 A | 1/2006 |
| JP | 2010-58676 A | 3/2010 |
| JP | 2012-503566 A | 2/2012 |
| JP | 2015-85725 A | 5/2015 |
| JP | 2015-214168 A | 12/2015 |
| JP | 2015-217842 A | 12/2015 |
| JP | 2015-217923 A | 12/2015 |
| JP | 2016-37207 A | 3/2016 |
| JP | 2016-37208 A | 3/2016 |
| JP | 2016-88308 A | 5/2016 |

OTHER PUBLICATIONS

English language translation of the following: Office action dated Jul. 30, 2019 from the JPO in a Japanese patent application No. 2016-103528 corresponding to the instant patent application.
English language translation of the following: Office action dated Jul. 30, 2019 from the JPO in a Japanese patent application No. 2016-099657 corresponding to the instant patent application.
Restriction Requirement dated Apr. 16, 2021 issued by USPTO in U.S. Appl. No. 16/099,678.
Non-Final Office Action issued by USPTO dated Aug. 31, 2021, in related U.S. Appl. No. 16/099,678.

* cited by examiner

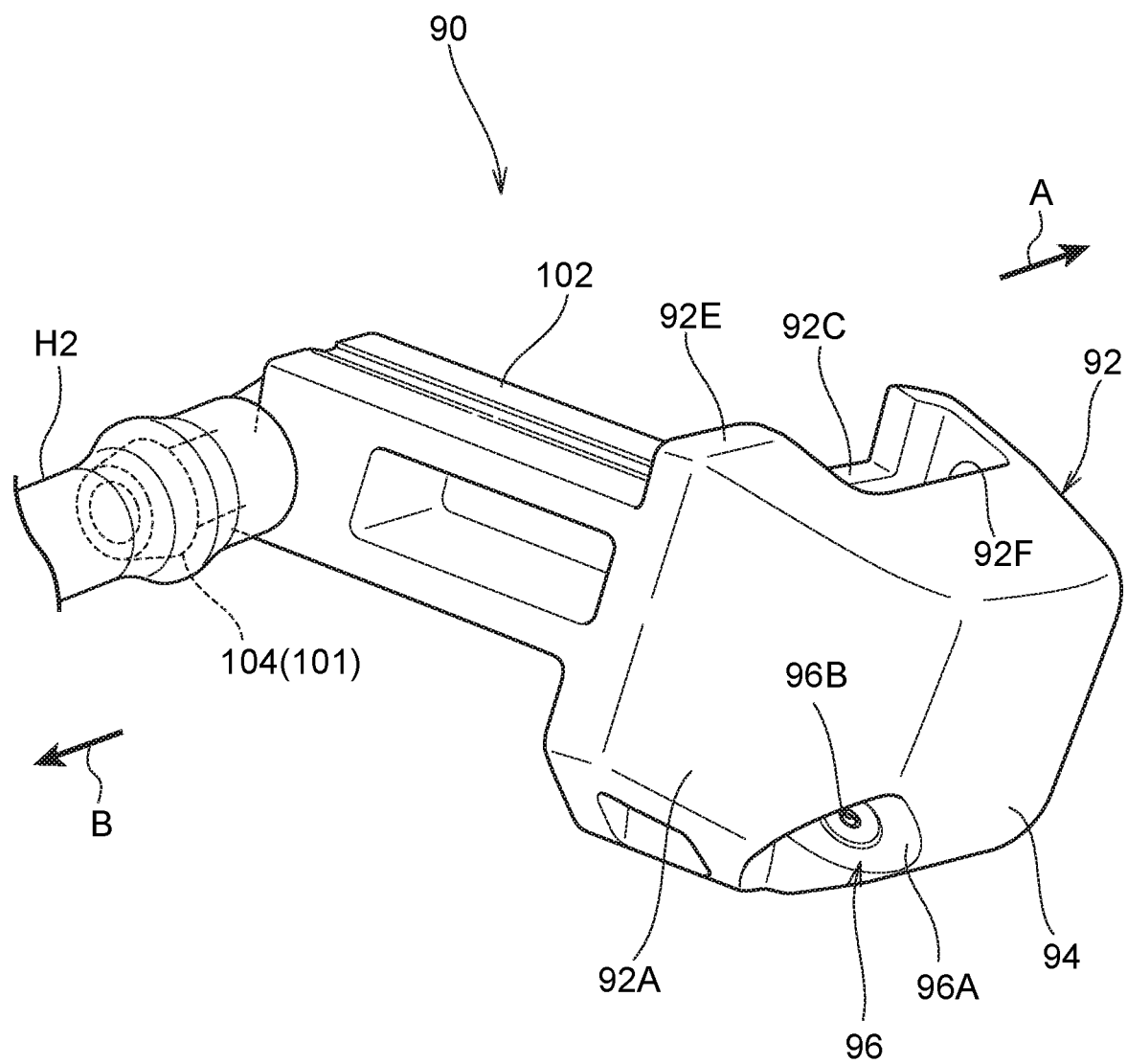

VEHICLE WIPER DEVICE

CROSS-REFERENCE TO RELATED APPLICATIONS

The present application is a divisional application of U.S. Ser. No. 16/099,678, filed on Nov. 7, 2018, which is a National Stage application of International Application No. PCT/JP2017/018753, filed on May 18, 2017, which claims priority to Japanese Application No. 2016-099657, filed on May 18, 2016, Japanese Application No. 2016-104671, filed on May 25, 2016, and Japanese Application No. 2016-103528, filed on May 24, 2016. Each of the above applications is hereby incorporated by reference, in its entirety, into the present application.

TECHNICAL FIELD

The present invention relates to a vehicle wiper device.

BACKGROUND ART

Vehicle wiper devices exist in which a nozzle that jets cleaning fluid is attached to a wiper arm, of which a leading end portion is configured by an arm piece (see, for example, Patent Document 1). This enables the nozzle to be disposed at a position close to a wiper blade that wipes a windshield glass.

Vehicle wiper devices have also been disclosed in which a nozzle is attached to a retainer of a wiper arm (see, for example, Patent Document 2). This enables the nozzle to be disposed at a position close to a wiper blade that wipes a windshield glass.

LIST OF PATENT DOCUMENTS

Patent Document 1: Japanese Utility Model Application Laid-Open (JP-U) No. H06-33763
Patent Document 2: Japanese Patent Application Laid-Open (JP-A) No. 2003-341484

SUMMARY OF INVENTION

Technical Problem

In vehicle wiper devices such as those described above, in which a wiper arm including an arm piece is provided, a leading end portion of the arm piece is normally disposed directly above a wiper blade. In the vehicle wiper devices described above, a nozzle body that jets cleaning fluid is disposed so as to be adjacent to a lower face of the arm piece. Consequently, the nozzle body is disposed at the upper side of the wiper blade. There is therefore a concern of enlarging the bulk of the vehicle wiper device in a height direction of the vehicle wiper device (a direction orthogonal to a wiped surface of the windshield glass).

In cases in which a nozzle body is attached to a wiper arm (arm piece) positioned on the opposite side of the wiper blade from the windshield glass, cleaning fluid jetted from the nozzle body might be affected by airflow blowing up along the windshield glass, causing the cleaning fluid to land erratically. A structure that suppresses the effect of airflow on the cleaning fluid is therefore desirable in cases in which a nozzle is provided at a wiper arm that includes an arm piece.

In cases in which a nozzle is attached to a wiper arm, a hose that supplies cleaning fluid to the nozzle is routed along the wiper arm. As described above, the attachment position of the nozzle is preferably a position disposed on one side in a swing direction (specifically, an outward movement side) of the wiper blade, in order to suppress the effect of airflow on the cleaning fluid jetted from the nozzle.

In vehicle wiper devices, it is also desirable to dispose the wiper blade on the one side in the swing direction (specifically, the outward movement side) of the wiper arm in order to improve the field of vision of a driver in the vehicle cabin. It therefore becomes necessary to dispose the hose straddling from the wiper arm side to opposite side of the wiper blade from the windshield, and to connect the hose to the nozzle on the one side in the swing direction (specifically, the outward movement side) of the wiper blade. There is a concern that, for example, the hose might be squashed as a result of the wiper blade being displaced toward the opposite side from the windshield and interfering with the hose, thus obstructing the flow of the cleaning fluid or swinging of the wiper arm might be obstructed by the wiper blade.

Moreover, in vehicle wiper devices in which a nozzle is attached to a retainer of a wiper arm as described above, the retainer is formed with an inverted substantially U-shaped cross-section profile as viewed along a length direction of the retainer, and the nozzle is disposed between side walls of the retainer. There is accordingly a possibility that flexibility of setting the jet direction of the cleaning fluid may be limited, since there is a need to set the jet direction of the cleaning fluid such that the cleaning fluid jetted from the nozzle will not be blocked by the side walls of the retainer. A structure allowing the flexibility of setting the jet direction of the cleaning fluid is thus desirable in cases in which a nozzle is attached to a retainer.

In consideration of the above circumstances, an object of the present invention is to provide a vehicle wiper device capable of suppressing the effect of airflow on cleaning fluid, while also suppressing an increase in size along a height direction, even in cases in which a nozzle body is attached to an arm piece.

The present invention also provides a vehicle wiper device capable of increasing the flexibility of setting a jet direction of cleaning fluid, even in cases in which the nozzle is attached to a retainer.

Solution to Problem

A vehicle wiper device of a first aspect of the present disclosure includes a wiper arm, a wiper blade, a nozzle body, a hose, and a cleaning fluid supply section. The wiper arm is formed in an elongated shape, includes a base end portion fixed to a pivot shaft and a leading end side portion configured by an arm piece, and swings back and forth about the pivot shaft. The wiper blade includes a blade rubber to wipe a windshield and a rubber holder retaining the blade rubber and coupled to a leading end portion of the arm piece. The wiper blade includes a base end portion disposed at an outward movement side of the wiper arm. The nozzle body is attached to the arm piece, is disposed at an outward movement side of the wiper blade, and jets cleaning fluid toward the windshield. The hose is routed along a length direction of the wiper arm, and cleaning fluid is conveyed through the hose under pressure. The cleaning fluid supply section is provided at an opposite side of the rubber holder from the windshield. The cleaning fluid supply section extends from the nozzle body so as to extend across the rubber holder from the outward movement side toward a return movement side of the wiper blade, is connected to one end portion of the hose, and supplies the cleaning fluid conveyed through the hose under pressure to the nozzle body.

According to the above aspect, the base end portion of the elongated wiper arm is fixed to the pivot shaft. The leading end side portion of the wiper arm is configured by the arm piece, and the rubber holder of the wiper blade is coupled to the leading end portion of the arm piece. The blade rubber of the wiper blade is retained by the rubber holder. Together with the wiper arm, the wiper blade thus swings back and forth about the pivot shaft, and the windshield is wiped by the blade rubber.

The base end portion of the wiper blade is disposed at the outward movement side of the wiper arm. Namely, a base end side portion of the wiper arm is disposed at the return movement side of the wiper blade. Accordingly, an increase in size of the vehicle wiper device in a height direction can be suppressed in comparison to configurations in which the base end side of the wiper arm (not including the leading end portion) is disposed so as to overlap with the base end portion of the wiper blade in plan view.

Note that the nozzle body that jets cleaning fluid toward the windshield is attached to the arm piece. The nozzle body is disposed at the outward movement side of the wiper blade. With respect to the wiper blade, the nozzle body is thus disposed at a downstream side of an airflow blowing up across the windshield, thereby enabling the airflow to be suppressed from affecting the cleaning fluid jetted from the nozzle body.

From the nozzle body attached to the arm piece, the cleaning fluid supply section extends across the rubber holder from the outward movement side toward the return movement side of the wiper blade. The cleaning fluid supply section is thus disposed so as to straddle the rubber holder. Moreover, one end portion of the hose routed along the length direction of the wiper arm is connected to the cleaning fluid supply section. This thereby enables the nozzle body and the hose, these being disposed at opposite sides with respect to the wiper blade to each other, to be connected together in the swing direction of the wiper blade by the cleaning fluid supply section that straddles the rubber holder.

A vehicle wiper device of a second aspect of the present disclosure includes a wiper arm, a retainer, a fixing portion, and a first nozzle. The wiper arm is formed in an elongated shape, includes a base end portion fixed to a pivot shaft and a leading end portion configured by an arm piece. The retainer configures a length direction intermediate portion of the wiper arm, is formed with a recessed profile opening toward a windshield side as viewed along a length direction of the retainer, and includes a top wall and a pair of side walls extending from both width direction ends of the top wall toward the windshield side. The fixing portion is formed, at a leading end side portion of the retainer, and fixes a base end portion of the arm piece in a state in which the base end portion of the arm piece is sandwiched by the top wall and a pair of fixing walls, the pair of fixing walls are formed by bending the pair of side walls toward a width direction inner side. The first nozzle is attached to the retainer, is disposed facing the fixing walls, and includes a jet opening that jets cleaning fluid toward the windshield.

According to the above configuration, the base end portion of the elongated wiper arm is fixed to the pivot shaft. The length direction intermediate portion of the wiper arm is configured by the retainer, and the retainer is formed with a recessed profile opening toward the windshield side as viewed along its length direction. Specifically, the retainer is configured including the top wall and the pair of side walls. The side walls extend from both width direction end of the top wall toward the windshield side.

The leading end portion of the wiper arm is configured by the arm piece. The base end portion of the arm piece is fixed by the fixing portion formed at the leading end side portion of the retainer. Specifically, the fixing portion includes the top wall and the pair of fixing walls, which are formed by bending the pair of side walls toward the width direction inner side. The base end portion of the arm piece is fixed so as to be inserted between the pair of fixing walls and the top wall. Since the side walls are employed as the fixing walls of the fixing portion, the retainer has a structure in which the side walls are not present at a location of the fixing portion.

The first nozzle is attached to the retainer, such that the first nozzle is disposed facing the fixing walls. The first nozzle can accordingly be attached to the retainer without disposing the side walls at both sides in a width direction of the retainer with respect to the jet opening of the first nozzle. This enables the cleaning fluid jetted from the jet opening to be suppressed from being blocked by the side walls. This thereby enables flexibility when setting the jet direction of the cleaning fluid jetted from the first nozzle to be increased, even when the first nozzle is attached to the retainer.

A nozzle of a third aspect of the present disclosure is attached to a wiper arm of a vehicle wiper device, and supplies cleaning fluid to a windshield. The nozzle includes a first face, a second face, and a jet opening. The first face faces either an outward movement side or a return movement side of the wiper arm. The second face is adjacent to the first face and faces a windshield side. A jet opening of the cleaning fluid is formed at a corner configuring a boundary between the first face and the second face.

According to the above configuration, the jet opening can be disposed straddling the first face and the second face of the nozzle while also being close to a wiped surface of the windshield. This enables the jet opening to be set with a broader angle range, in other words, flexibility when setting the jet direction of the cleaning fluid can be increased.

BRIEF DESCRIPTION OF DRAWINGS

FIG. 17 is a perspective view illustrating the main nozzle illustrated in FIG. 14, as viewed from a base end side of the main nozzle.

DESCRIPTION OF EMBODIMENTS

Figure 2:
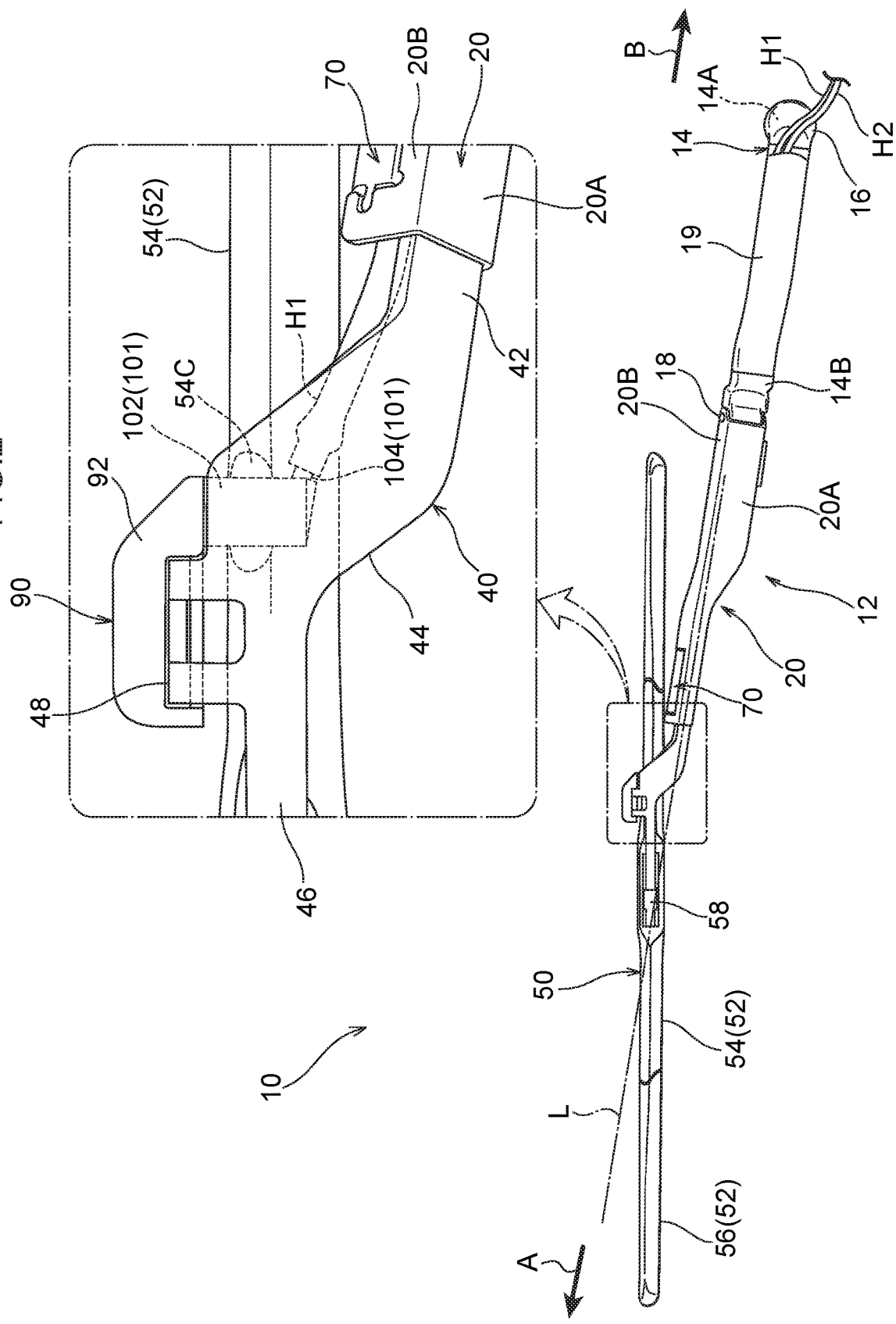
FIG. 2 is a plan view of the vehicle wiper device illustrated in FIG. 1, as viewed from an arm upper side.
Figure 3:
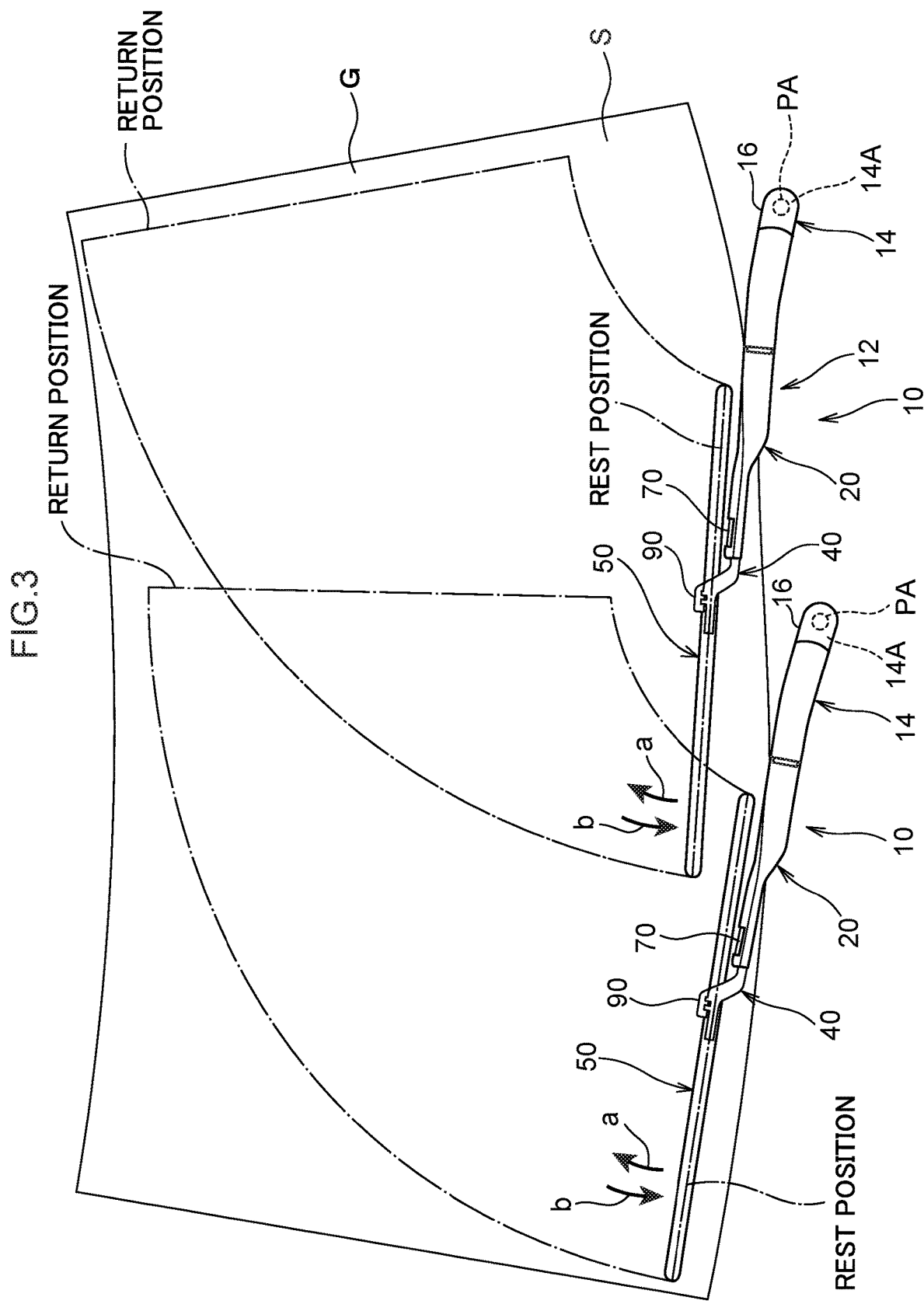
FIG. 3 is a plan view to explain swinging of a wiper arm illustrated in FIG. 2, as viewed from the outside of a wiped surface of a windshield glass.

Explanation follows regarding a vehicle wiper device 10 according to an exemplary embodiment, with reference to the drawings. As illustrated in FIG. 2 and FIG. 3, the vehicle wiper device 10 is configured including a wiper arm 12 that is formed in a substantially elongated shape, and a wiper blade 50 that has a substantially elongated shape and that is detachably coupled to a leading end portion of the wiper arm 12. The wiper arm 12 swings such that the wiper blade 50 wipes a wiped surface S of a windshield glass G (referred to hereafter as a WS glass G), serving as a windshield disposed at a vehicle front side section of a vehicle. This will now be explained in detail.

Overall Configuration of Wiper Arm

Figure 4:
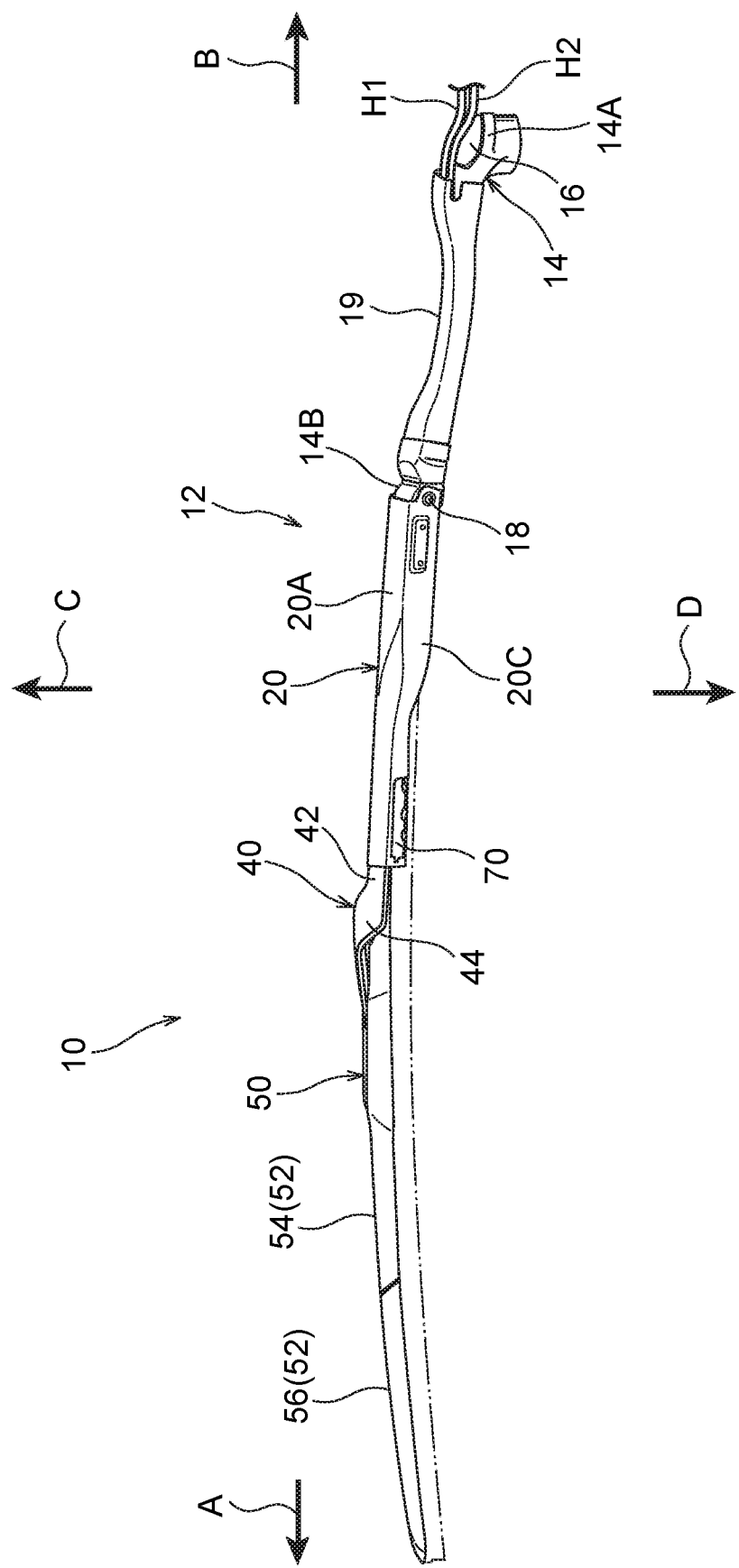
FIG. 4 is a side view of the vehicle wiper device illustrated in FIG. 2.

As illustrated in FIG. 2 and FIG. 4, the wiper arm 12 is formed in a substantially elongated shape, and is disposed facing the WS glass G in a thickness direction of the WS glass G (not illustrated in FIG. 2 or FIG. 4). The thickness direction is a direction orthogonal to the wiped surface S, and is indicated as the arrow C direction and arrow D direction in FIG. 4. Note that in the following explanation, one side in a length direction of the wiper arm 12 (the arrow A direction side in FIG. 2 and FIG. 4) is referred to as an arm leading end side, and another side in the length direction of the wiper arm 12 (the arrow B direction side in FIG. 2 and FIG. 4) is referred to as an arm base end side. Moreover, an opposite side of the wiper arm 12 from the WS glass G (the arrow C direction side in FIG. 4) is referred to as an arm upper side, and a WS glass G side of the wiper arm 12 (the arrow D direction side in FIG. 4) is referred to as an arm lower side.

The wiper arm 12 includes an arm head 14 configuring a base end side portion of the wiper arm 12, a retainer 20 configuring a length direction intermediate portion of the wiper arm 12, and an arm piece 40 configuring a leading end side portion of the wiper arm 12. The wiper blade 50 is coupled to a leading end portion of the arm piece 40. A main nozzle unit 90, serving as a nozzle or a second nozzle, is attached to the arm piece 40. Moreover, a sub nozzle unit 70, serving as a first nozzle, is attached to a leading end side portion of the retainer 20. Namely, the wiper arm 12 is provided with nozzles. A main nozzle hose H1, serving as a hose that supplies cleaning fluid to the main nozzle unit 90, and a sub nozzle hose H2 that supplies cleaning fluid to the sub nozzle unit 70, are routed as two systems inside the retainer 20. Explanation follows regarding each of these configurations.

Arm Head

The arm head 14 is manufactured from die cast aluminum, and is formed in a substantially elongated block shape. A base end portion of the arm head 14 is formed with a fixing portion 14A, and the fixing portion 14A is fastened and fixed to a leading end portion of a substantially circular column shaped pivot shaft PA (see FIG. 3). The pivot shaft PA is supported by a pivot holder (not illustrated in the drawings) fixed to a vehicle frame or the like such that the pivot shaft PA is capable of swinging, and is coupled to a wiper motor (not illustrated in the drawings) via a link mechanism or the like. Drive force of the wiper motor swings the pivot shaft PA back and forth. As illustrated in FIG. 3, the wiper arm 12 swings back and forth between a rest position and a return position. Note that an outward movement direction of the wiper arm 12 from the rest position to the return position (the arrow "a" direction in FIG. 3) configures one side in the swing direction, and a return movement direction of the wiper arm 12 from the return position to the rest position (the arrow "b" direction in FIG. 3) configures another side in the swing direction. Note that the rest position may be set as a stowed position further to a lower side from a lower side return position of the wiper arm 12 (in other words, the wiper blade 50). In such cases, the back and forth swinging of the wiper arm 12 is between the upper and lower return positions. An upper portion of the fixing portion 14A of the arm head 14 is covered from the arm upper side by a cap 16, such that the leading end portion of the pivot shaft PA is hidden from sight by the cap 16.

As illustrated in FIG. 2 and FIG. 4, a leading end portion of the arm head 14 is formed with a head-side coupler 14B for coupling the retainer 20, described later, to the arm head 14. A coupling shaft 18 with its axial direction in a width direction of the arm head 14 is provided so as to pass through the head-side coupler 14B.

The main nozzle hose H1 and the sub nozzle hose H2, described later, are routed inside the arm head 14. The main nozzle hose H1 and the sub nozzle hose H2 extend from a lower end portion of the leading end portion of the arm head 14 toward a side of the retainer 20, described later (see FIG. 5), and are then routed inside the retainer 20. A resin head cover 19 is mounted to the arm head 14 from the arm upper side.

Retainer

Figure 1:
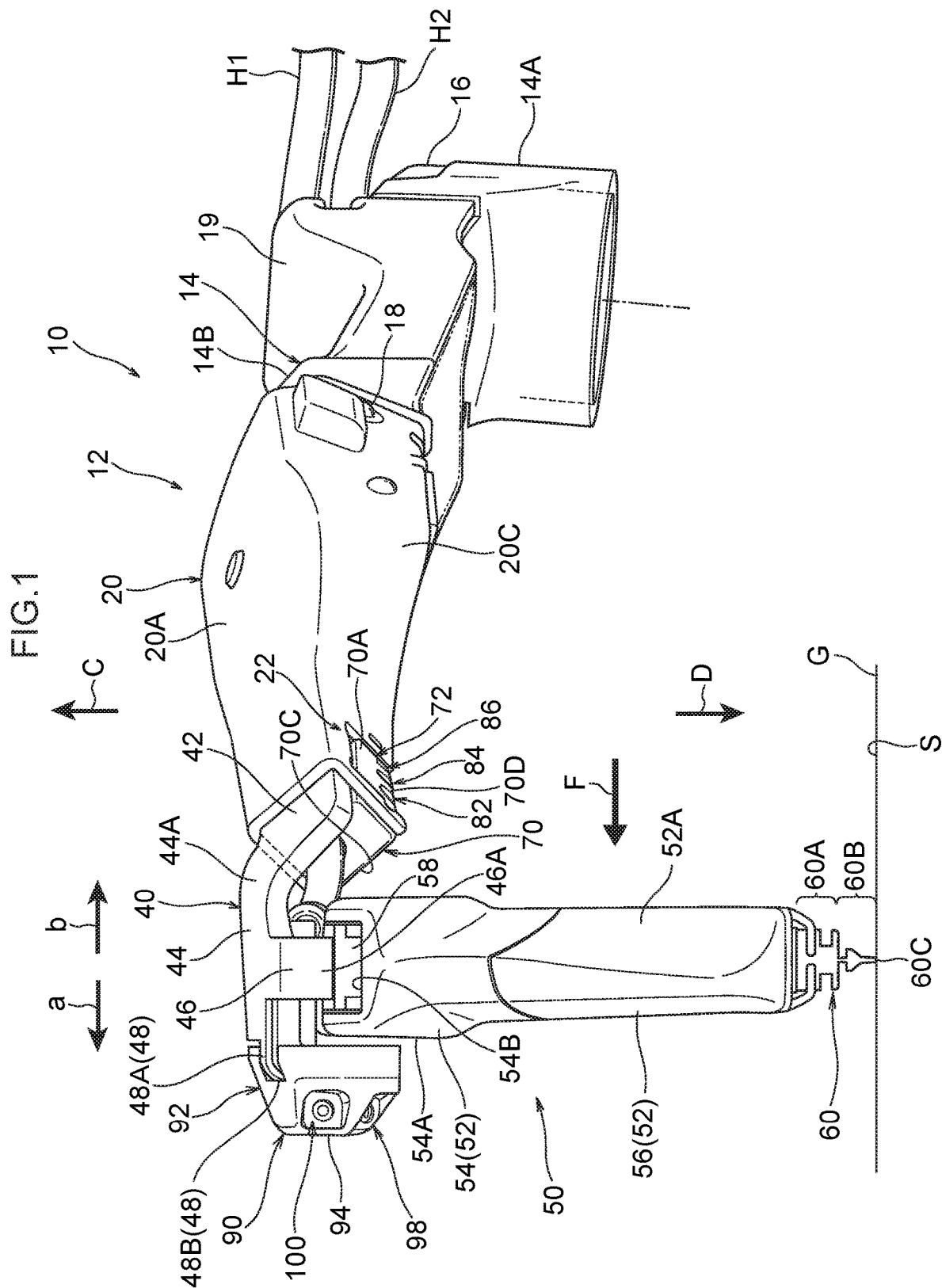
FIG. 1 is a front view of a vehicle wiper device according to an exemplary embodiment, as viewed from an arm leading end side.

The retainer 20 is formed in a substantially elongated shape, and is manufactured by bending a metal sheet material in a press. The retainer 20 is formed with a substantially U-shaped (recessed) cross-section profile opening toward the arm lower side (WS glass G side) as viewed along its length direction. Specifically, the retainer 20 is configured including a top wall 20A, and a pair of side walls 20B, 20C extending from both width direction edges of the top wall 20A toward the arm lower side. As illustrated in FIG. 1, as viewed from the arm leading end side, a leading end side portion of the retainer 20 twists by about 45° in clockwise direction (toward the right) on progression toward the arm leading end side, in other words, the top wall 20A at a leading end side of the retainer 20 is twisted with respect to the top wall 20A at a base end side of the retainer 20 so as to be inclined at an angle of approximately 45° with respect the wiped surface S of the WS glass thus forming an upward gradient with respect to an induced airflow (see arrow F in FIG. 1). A width dimension of the retainer 20 is set so as to become smaller on progression toward the arm leading end side.

Figure 5:
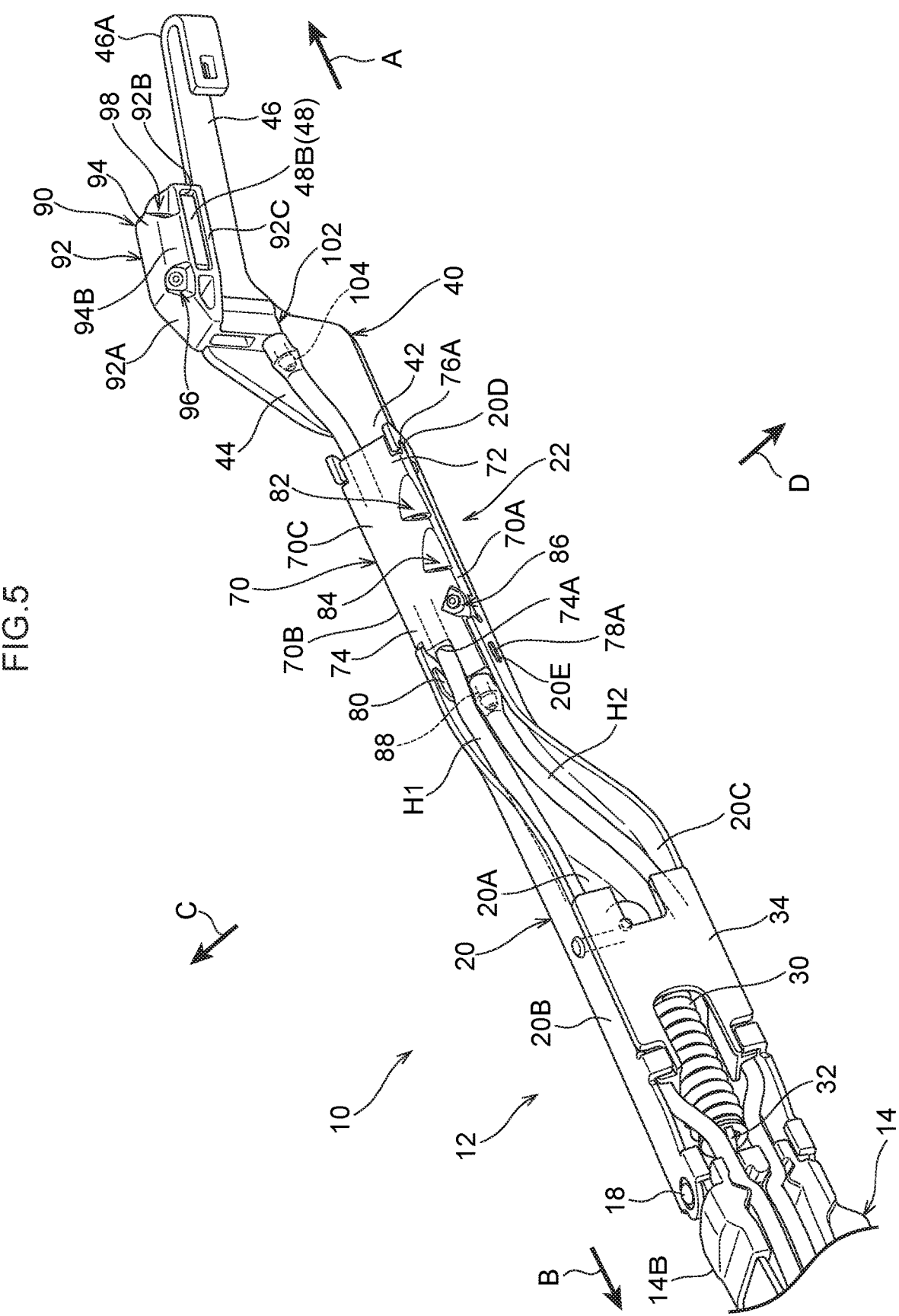
FIG. 5 is a perspective view illustrating a retainer and an arm piece illustrated in FIG. 4, as viewed from a windshield glass side.

As illustrated in FIG. 5, the head-side coupler 14B of the arm head 14 is housed inside a base end portion of the retainer 20, and the base end portion of the retainer 20 is coupled to the arm head 14. Specifically, both length direction end portions of the previously-described coupling shaft 18 are fixed to base end portions of the pair of side walls 20B, 20C of the retainer 20 by swaging or the like. The retainer 20 is thereby coupled to the arm head 14, and is capable of swinging about the coupling shaft 18. Namely, the retainer 20 (wiper arm 12) is capable of swinging between a wiping position disposed substantially parallel to the WS glass G (a position illustrated in FIG. 2 and FIG. 3, in which a blade rubber 60 is in contact with the wiped surface S of the WS glass G), and a standing position, not illustrated in the drawings, in which the retainer 20 stands up from the WS glass G (what is referred to as a lock-back position).

A compression spring 30 for biasing the retainer 20 toward the side of the wiped surface S of the WS glass G is also disposed inside the base end portion of the retainer 20. A substantially elongated spring guide 32 is disposed inside the compression spring 30. A base end portion of the spring guide 32 is rotatably coupled to the head-side coupler 14B with its axial direction in the width direction of the arm head 14. One end portion of the compression spring 30 is supported by the spring guide 32, and the spring guide 32 maintains the orientation of the compression spring 30. The other end portion of the compression spring 30 and a leading end of the spring guide 32 are supported by a non-illustrated bracket provided inside the retainer 20. The compression spring 30 applies a biasing force to the retainer 20 as a swinging force toward the WS glass G side, thereby pressing the wiper blade 50 against the wiped surface S when in the wiping position. A retainer cover 34 is mounted to the base end portion of the retainer 20, such that an opening of the base end portion of the retainer 20 is closed off by the retainer cover 34.

Figure 6:
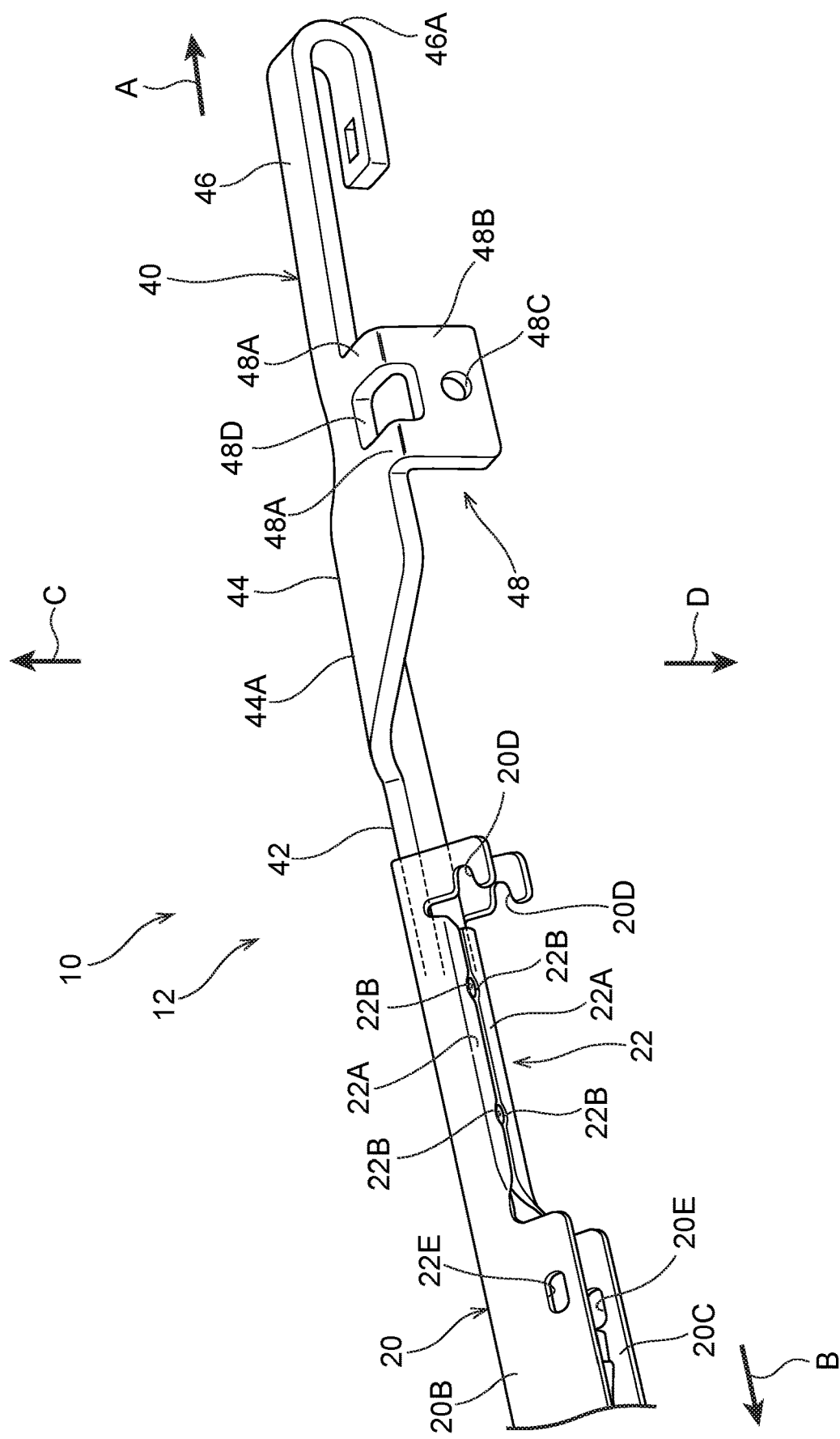
FIG. 6 is a perspective view illustrating a coupled state of the retainer and the arm piece illustrated in FIG. 5, as viewed from the side.
Figure 7:
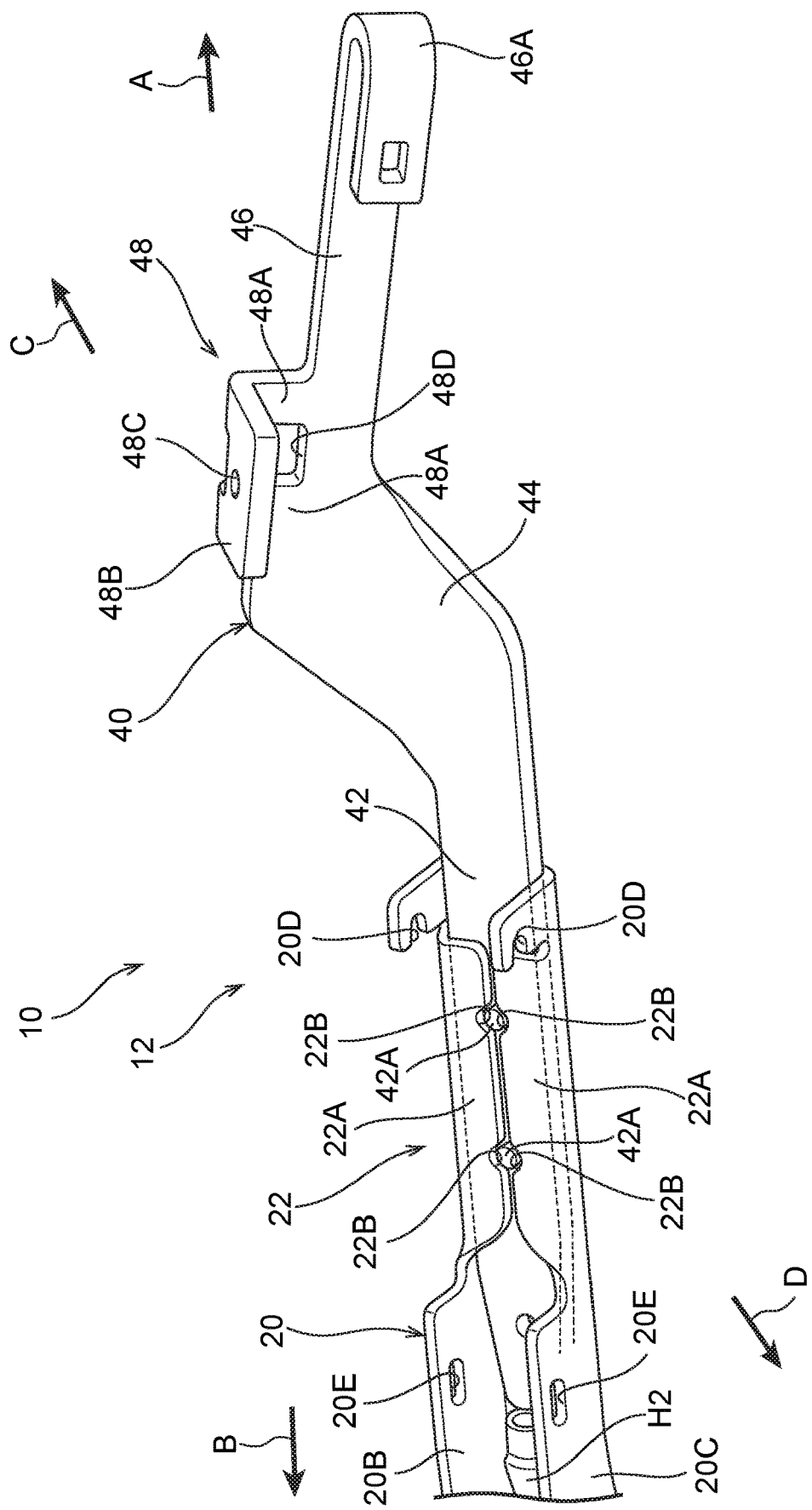
FIG. 7 is a perspective view illustrating a coupled state of the retainer and the arm piece illustrated in FIG. 6, as viewed from a windshield glass side.

A swaged portion 22, serving as a fixing portion for fixing a base end portion of the arm piece 40, described later, is formed at a leading end side portion of the retainer 20. As illustrated in FIG. 6 and FIG. 7, the swaged portion 22 is configured including a pair of swaged walls 22A, serving as fixing walls, configured by bending base end portions of the side walls 20B, 20C of the retainer 20 toward a width direction inner side of the retainer 20. The swaged walls 22A wrap around the base end portion of the arm piece 40, thereby swaging the base end portion of the arm piece 40. Since the side walls 20B, 20C of the retainer 20 are thus employed as the swaged walls 22A in the swaged portion 22, the retainer 20 is structured such that the side walls 20B, 20C are not present at a location of the swaged portion 22. Opening end portions of the pair of swaged walls 22A are each formed with plural substantially semicircular notches 22B (two each in the present exemplary embodiment), and the notches 22B are disposed separated from each other in the length direction of the retainer 20. Moreover, the notches 22B formed in one of the swaged walls 22A are disposed at positions aligned with the notches 22B formed in the other of the swaged walls 22A in the width direction of the retainer 20, thereby forming pairs of adjacent notches 22B.

Moreover, an anchor groove 20D for attaching (anchoring) the sub nozzle unit 70, described later, is formed at an end portion of each of the side walls 20B, 20C at a leading end portion of the retainer 20, specifically, at the side walls 20B, 20C of the retainer 20 at the arm leading end side relatively to the swaged portion 22. Each anchor groove 20D is formed as a substantially U-shaped opening opened at the arm base end side, and the anchor grooves 20D are disposed further toward leading end sides (opening end sides) of the side walls 20B, 20C from the swaged walls 22A. Moreover, anchor holes 20E for attaching (anchoring) the sub nozzle unit 70 are formed penetrating the side walls 20B, 20C at the arm base end side from the swaged portion 22 of the retainer 20. Each anchor hole 20E is formed in a substantially racetrack shape extending along the length direction of the retainer 20, and the anchor holes 20E are disposed further toward a leading end sides (opening end sides) of the side walls 20B, 20C from the swaged walls 22A.

Arm Piece

The arm piece 40 illustrated in FIG. 6 and FIG. 7 is manufactured by pressing a metal sheet material in a press. The arm piece 40 is formed in a substantially elongated plate shape, and extends along the length direction of the wiper arm 12. The arm piece 40 is configured including an arm piece fixing portion 42 configuring a base end side portion of the arm piece 40, a crank portion 44 configuring a length direction intermediate portion of the arm piece 40, and an arm piece coupling portion 46 configuring a leading end side portion of the arm piece 40.

The previously-described swaged portion 22 of the retainer 20 is wrapped around a base end portion of the arm piece fixing portion 42 by swaging, thereby fixing the arm piece fixing portion 42 to the leading end portion of the retainer 20. Specifically, the arm piece fixing portion 42 is fixed to the swaged portion 22 in a state in which the arm piece fixing portion 42 is inserted between the top wall 20A and the swaged walls 22A of the retainer 20. The arm piece fixing portion 42 is thereby disposed parallel to the top wall 20A of the retainer 20, and is in tight contact with an inner side face of the top wall 20A. As described above, at a leading end side portion of the retainer 20, the top wall 20A is inclined by approximately 45° with respect to the WS glass G as viewed from the arm leading end side of the retainer 20. The arm piece fixing portion 42 is therefore also disposed to be inclined at approximately 45° with respect to the WS glass G as viewed from the arm leading end side of the retainer 20 (see FIG. 1).

Moreover, a pair of dowels 42A (see FIG. 7) are formed at the base end portion of the arm piece fixing portion 42 at positions corresponding to the notches 22B of the swaged walls 22A. Each dowel 42A is formed in a substantially circular column shape, projects toward the arm lower side (the opposite side from the top wall 20A), and is disposed inside a pair of the notches 22B. The arm piece 40 is thereby prevented from coming apart from the retainer 20 in the length direction even if the fixing of the arm piece fixing portion 42 by the swaged portion 22 were to become loose, since the dowels 42A engage with inner peripheral faces of the respective notches 22B.

As illustrated in FIG. 2, the crank portion 44 is formed in a substantially crank shape jutting out toward the one side in the swing direction with respect to the arm piece fixing portion 42 in plan view. The leading end portion of the arm piece 40, namely, the arm piece coupling portion 46 is thus offset toward the one side in the swing direction with respect to the arm piece fixing portion 42, namely, the leading end portion of the retainer 20. The arm piece coupling portion 46 extends in a substantially straight line from a leading end portion of the crank portion 44 so as to intersect the length direction of the wiper arm 12. Specifically, in plan view, the arm piece coupling portion 46 extends in a substantially straight line from the leading end portion of the crank portion 44 and is disposed at a slight angle so as to be apart from a reference line L running along the length direction of the wiper arm 12 on progression toward the arm leading end side. In plan view, in a coupled state of the wiper blade 50, described later, to the arm piece 40, the wiper blade 50 is set so as to be apart from the wiper arm 12 on progression toward the arm base end side. Moreover, in the present exemplary embodiment, a width direction center line CL1 running along the length direction of the arm piece coupling portion 46 is set so as to run parallel to a width direction center line CL2 running along the length direction of the wiper blade 50, described later (see FIG. 13).

Width dimensions of the arm piece fixing portion 42 and the crank portion 44 are set to be larger than a width dimension of the arm piece coupling portion 46. Moreover, as illustrated in FIG. 1, a bend 44A is formed at a length direction intermediate portion of the crank portion 44. The crank portion 44 bends at the bend 44A such that a leading end portion of the crank portion 44, namely, the arm piece coupling portion 46, is disposed substantially parallel to the wiped surface S of the WS glass G as viewed from the leading end side of the arm piece 40. In other words, as viewed from the leading end side of the arm piece 40, a portion of the crank portion 44 on the arm piece coupling portion 46 side is disposed substantially parallel to the wiped surface S of the WS glass and a portion of the crank portion 44 on the arm piece fixing portion 42 side is inclined at an angle of approximately 45° toward the arm lower side on progression from the bend 44A toward the other side in the swing direction.

As illustrated in FIG. 6 and FIG. 7, a hook 46A for coupling the wiper blade 50 is formed at a leading end portion of the arm piece coupling portion 46. The hook 46A is bent toward the arm lower side (WS glass G side), and doubles back to form a substantially U shape opening opened toward the arm base end side in side view. Note that the shape and dimensions of the hook 46A conform to JIS D5710.

An attachment wall 48 for attaching the main nozzle unit 90, described later, is integrally formed at a portion on the one side in the swing direction of the leading end portion of the crank portion 44 (the portion to which the arm piece coupling portion 46 is connected). As viewed from the leading end side of the arm piece 40, the attachment wall 48 is formed bent substantially into an inverted L-shape jutting out toward the one side in the swing direction with respect to the arm piece coupling portion 46. Specifically, the attachment wall 48 is configured including a jutting-out wall 48A that juts out toward the one side in the swing direction (outward movement side of the wiper arm 12) with respect to the arm piece coupling portion 46 at a predetermined position at the base end side of the arm piece coupling portion 46, and a hanging wall 48B that is bent from a leading end of the jutting-out wall 48A at a substantially right angle toward the arm lower side. The extension length of the hanging wall 48B from the arm piece 40 is set such that a lower end of the hanging wall 48B projects further to the arm lower side (WS glass G side) from a lower end of the hook 46A.

A substantially circular fitting hole 48C, into which a fitting projection 92D of the main nozzle unit 90, described later, is fitted, is formed penetrating a substantially central portion of the hanging wall 48B. An escape hole 48D is formed penetrating a bend portion configuring a boundary between the hanging wall 48B and the jutting-out wall 48A at a width direction central portion of the attachment wall 48. The escape hole 48D is formed in a substantially rectangular shape in an opened-out state of the attachment wall 48. Namely, the escape hole 48D is formed spanning between an upper end portion of the hanging wall 48B and the jutting-out wall 48A. The escape hole 48D thus splits the jutting-out wall 48A in the length direction of the arm piece coupling portion 46.

Wiper Blade

As illustrated in FIG. 1, FIG. 2, FIG. 4, and FIG. 13, the wiper blade 50 is formed in a substantially elongated shape, and a length direction central portion of the wiper blade 50 is coupled to the hook 46A of the arm piece 40. In a coupled state of the wiper blade 50, the wiper blade 50 is disposed at an arm lower side (WS glass G side) of the arm piece coupling portion 46, and extends along the length direction of the arm piece coupling portion 46. The wiper blade 50 is thus disposed at the one side in the swing direction (outward movement side) of the wiper arm 12, with the exception of a portion at the arm piece coupling portion 46. In other words, with the exception of the portion at the arm piece coupling portion 46, the wiper arm 12 is disposed on the other side in the swing direction (return movement side) of the wiper blade 50. The hanging wall 48B of the attachment wall 48, described above, is disposed at the one side in the swing direction of the wiper blade 50.

Figure 20:
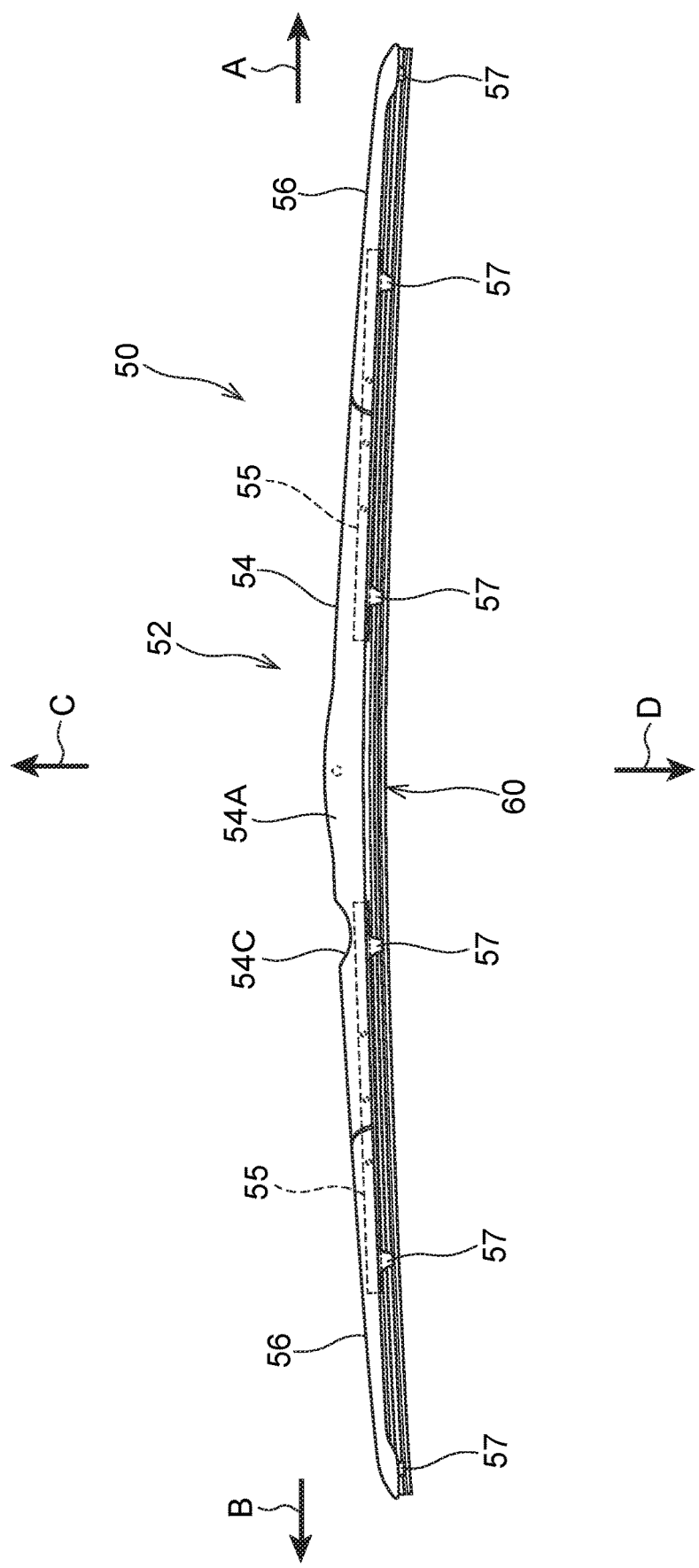
FIG. 20 is a side view illustrating the entirety of a wiper blade illustrated in FIG. 4.

As illustrated in FIG. 20, the wiper blade 50 is configured including a lever unit 52, serving as a rubber holder configuring an upper section of the wiper blade 50, and the blade rubber 60, configuring a lower section of the wiper blade 50. The lever unit 52 includes a main lever 54 that is coupled to the arm piece coupling portion 46 and that configures a length direction intermediate portion of the lever unit 52, and a pair of blade covers 56 that configure portions on both sides in a length direction of the lever unit 52.

Figure 21:
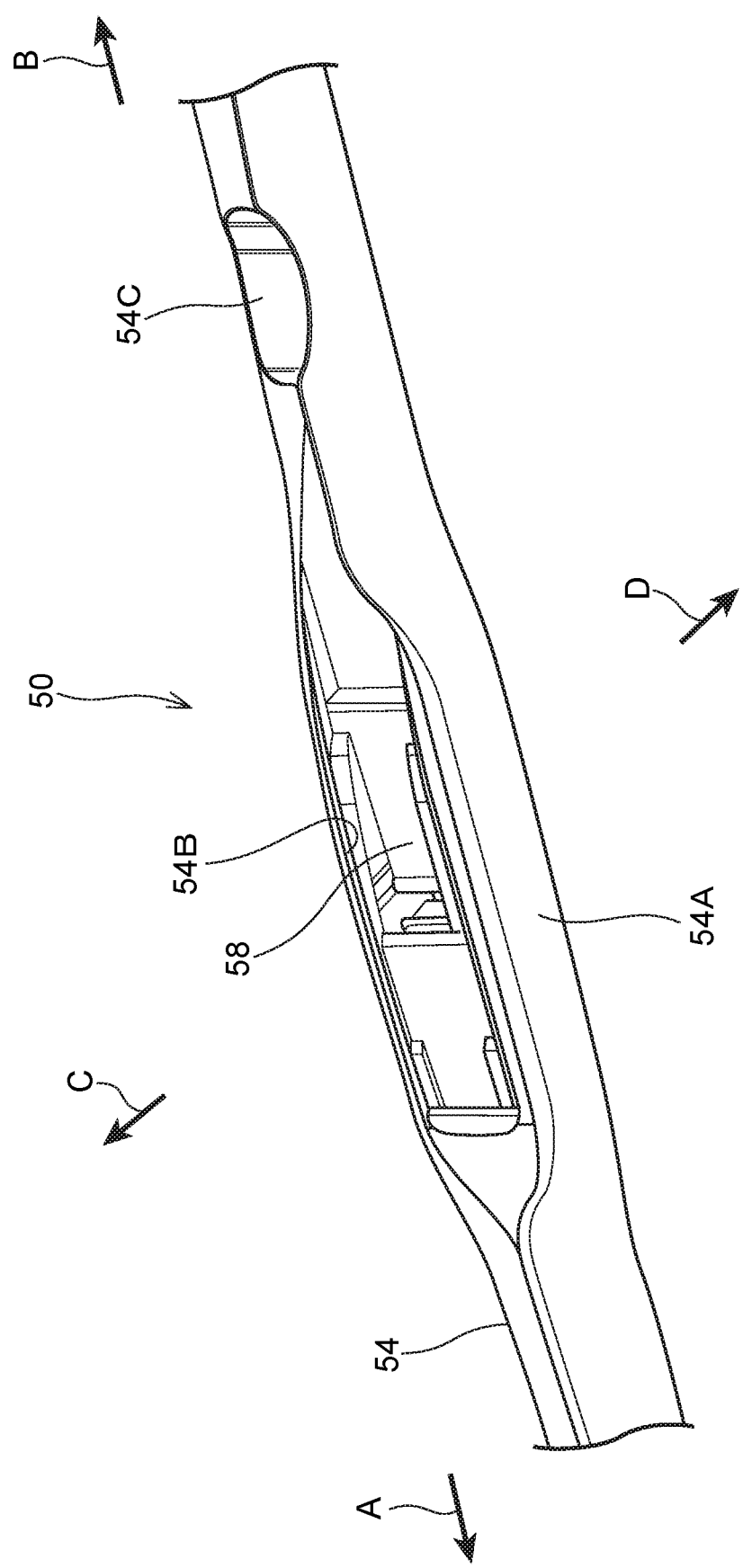
FIG. 21 is a perspective view illustrating a length direction central portion of the wiper blade illustrated in FIG. 20, as viewed from an arm upper side.

The main lever 54 is made from resin, and is formed with a recessed profile (substantially an inverted U-shaped profile) opening toward the WS glass G side as viewed along its length direction. The main lever 54 covers the blade rubber 60, described later, from the arm upper side. As illustrated in FIG. 21, a length direction central portion of the main lever 54 configures a protruding portion 54A, serving as a housing portion, and protruding toward both sides in a width direction of the main lever 54. A width dimension of the protruding portion 54A is set slightly larger than a width dimension of portions at both sides in the length direction of the main lever 54. The hanging wall 48B of the arm piece 40 described above is disposed further toward a base end side of the main lever 54 from the protruding portion 54A, and further toward the one side in the swing direction from a base end side portion of the main lever 54 (see FIG. 13).

In the protruding portion 54A, an opening 54B is formed extending along the length direction of the wiper blade 50.

A coupling member 58 is provided to (housed in) the protruding portion 54A at a position corresponding to the opening 54B, and the coupling member 58 is supported by the main lever 54 so as to be capable of swinging about an axis running in the width direction of the wiper blade 50. The hook 46A of the arm piece 40 is inserted through the opening 54B of the main lever 54 and coupled to the coupling member 58, thereby coupling the main lever 54 (the wiper blade 50) to the arm piece 40 (see FIG. 13). In the coupled state of the main lever 54, the base end side portion of the main lever 54 is disposed at the arm lower side of a leading end side portion of the crank portion 44 of the arm piece 40 (see FIG. 13).

Moreover, a depression 54C with a recessed profile is provided at an upper portion of the main lever 54, at a position further toward the base end side of the main lever 54 from the protruding portion 54A. More specifically, the depression 54C is formed across the entire width direction of the wiper blade 50, and is formed with a recessed profile in a substantially circular arc shape opening toward the arm upper side (the opposite side from the WS glass G) in side view. In a coupled state of the main lever 54 and the arm piece 40, the depression 54C is disposed at the main lever 54 at a position separated by a predetermined distance from the base end side of the coupling member 58 provided in the opening 54B of the protruding portion 54A (or the arm piece coupling portion 46) so as to be disposed at a position further toward the base end side from the hanging wall 48B. The depression 54C is moreover disposed at the arm lower side (WS glass G side) of the leading end side portion of the crank portion 44. The depression 54C is thus disposed at a position overlapping with the leading end side portion of the crank portion 44 in plan view, and is covered by the crank portion 44 from the arm upper side (see the enlarged portion in FIG. 2).

As illustrated in FIG. 20, a yoke lever 55 is coupled to each end portion in the length direction of the main lever 54. Each yoke lever 55 extends along the length direction of the wiper blade 50, and a length direction central portion of each yoke lever 55 is coupled to the main lever 54 so as to be capable of swinging about an axis running in the width direction of the wiper blade 50. Moreover, a base end portion of the corresponding blade cover 56 is coupled to each yoke lever 55 so as to be capable of swinging about an axis running in the width direction of the wiper blade 50. The blade covers 56 are made of resin, and are each formed with a recessed profile opening toward the WS glass G side as viewed along the length direction. The yoke levers 55 are thus disposed so as to be housed at the arm lower side of the main lever 54 and the blade covers 56. Moreover, grips 57 that grip the blade rubber 60 are provided at the yoke levers 55 and the blade covers 56. A finned face 52A (see FIG. 1) is formed at a wiper arm 12 side (vehicle front side or an induced airflow upstream side) surface of the main lever 54 and the blade covers 56 to catch the induced airflow and cause a pressing force toward the wiped surface S to act on the wiper blade 50.

As illustrated in FIG. 1, the blade rubber 60 is configured from a rubber material, and extends along the length direction of the wiper blade 50. An upper portion of the blade rubber 60 configures a base 60A. The base 60A is gripped by the grips 57 of the yoke levers 55 and the blade covers 56, thereby attaching the blade rubber 60 to the lever unit 52. The base 60A is mounted with a sheet-shaped backing strip (not illustrated in the drawings) configured from a springy material, such that the spring force of the backing strip causes the blade rubber 60 to conform to the wiped surface S of the WS glass thereby distributing pressing force from the wiper arm 12 along the length direction of the blade rubber 60.

A lower portion of the blade rubber 60 configures a wiper portion 60B. The wiper portion 60B is formed with a substantially triangular cross-section profile, and a width dimension of the wiper portion 60B is set so as to become smaller on progression toward the WS glass G side. A lip 60C configuring a tip of the wiper portion 60B abuts the wiped surface S of the WS glass such that the tip of the wiper portion 60B wipes the wiped surface S.

Sub Nozzle

Figure 8:
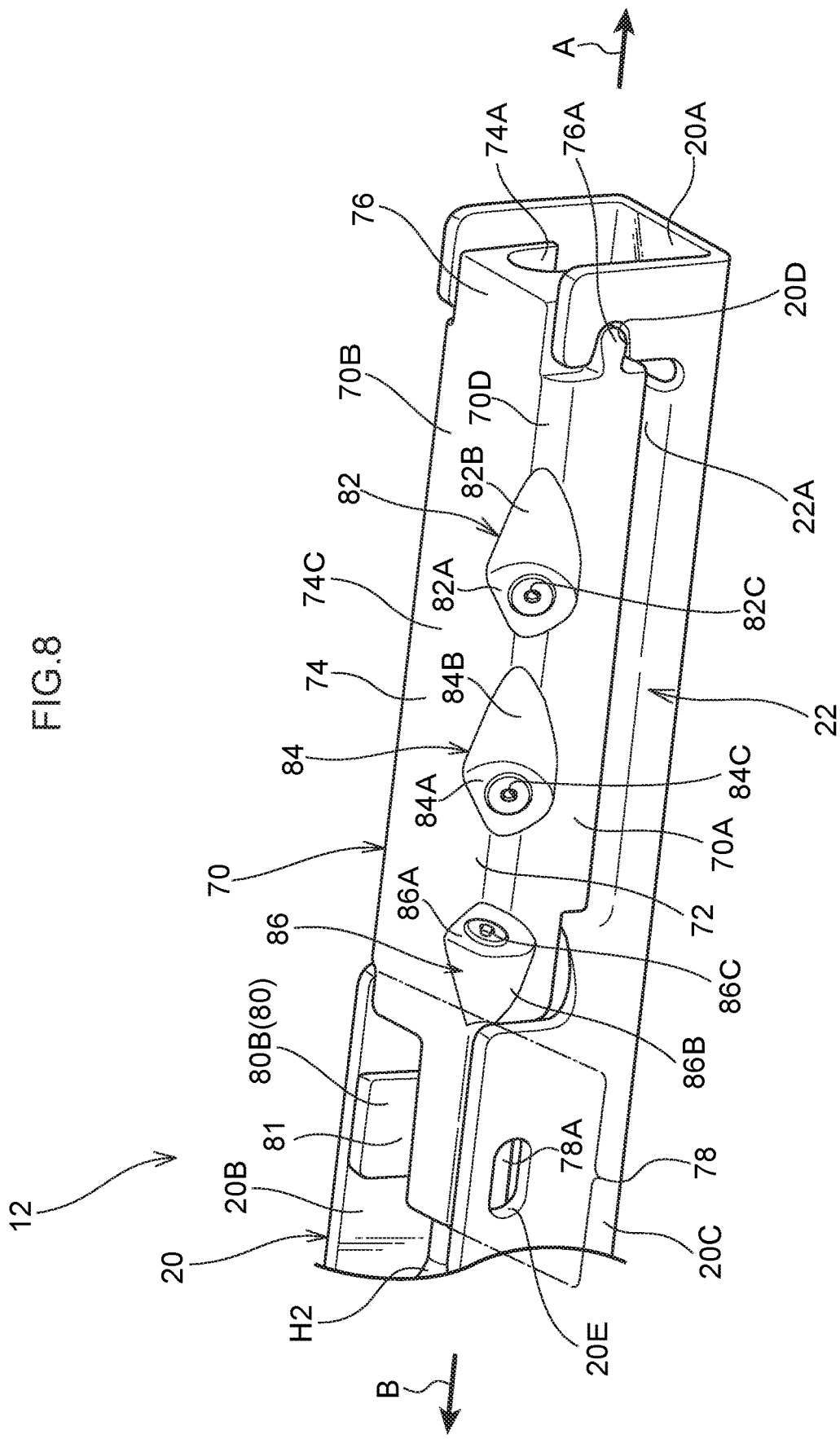
FIG. 8 is an enlarged perspective view illustrating an attached state of a sub nozzle illustrated in FIG. 5 to a retainer, as viewed from a windshield glass side.
Figure 9:
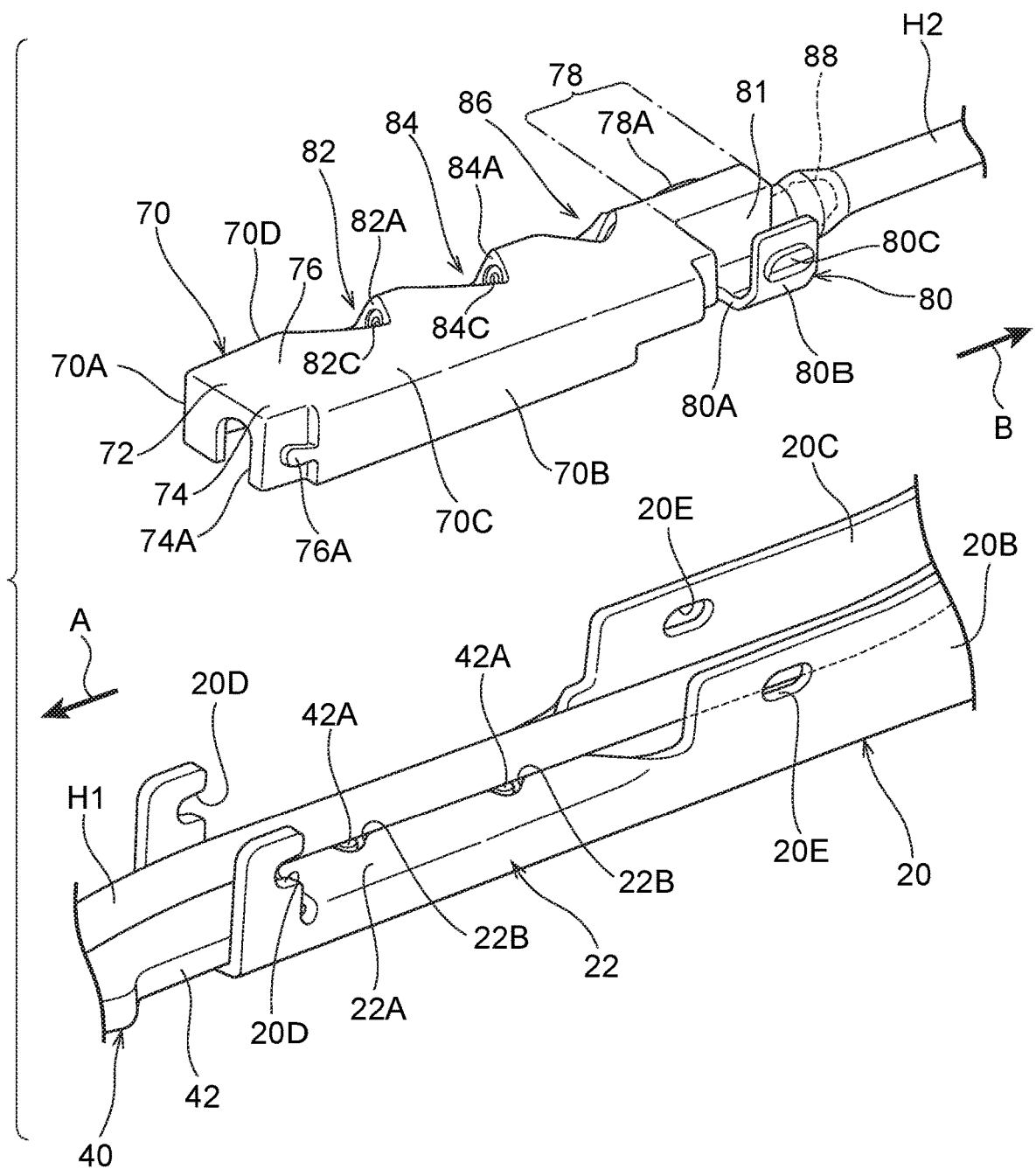
FIG. 9 is an exploded perspective view illustrating a state in which the sub nozzle illustrated in FIG. 8 has been removed from the retainer.
Figure 10:
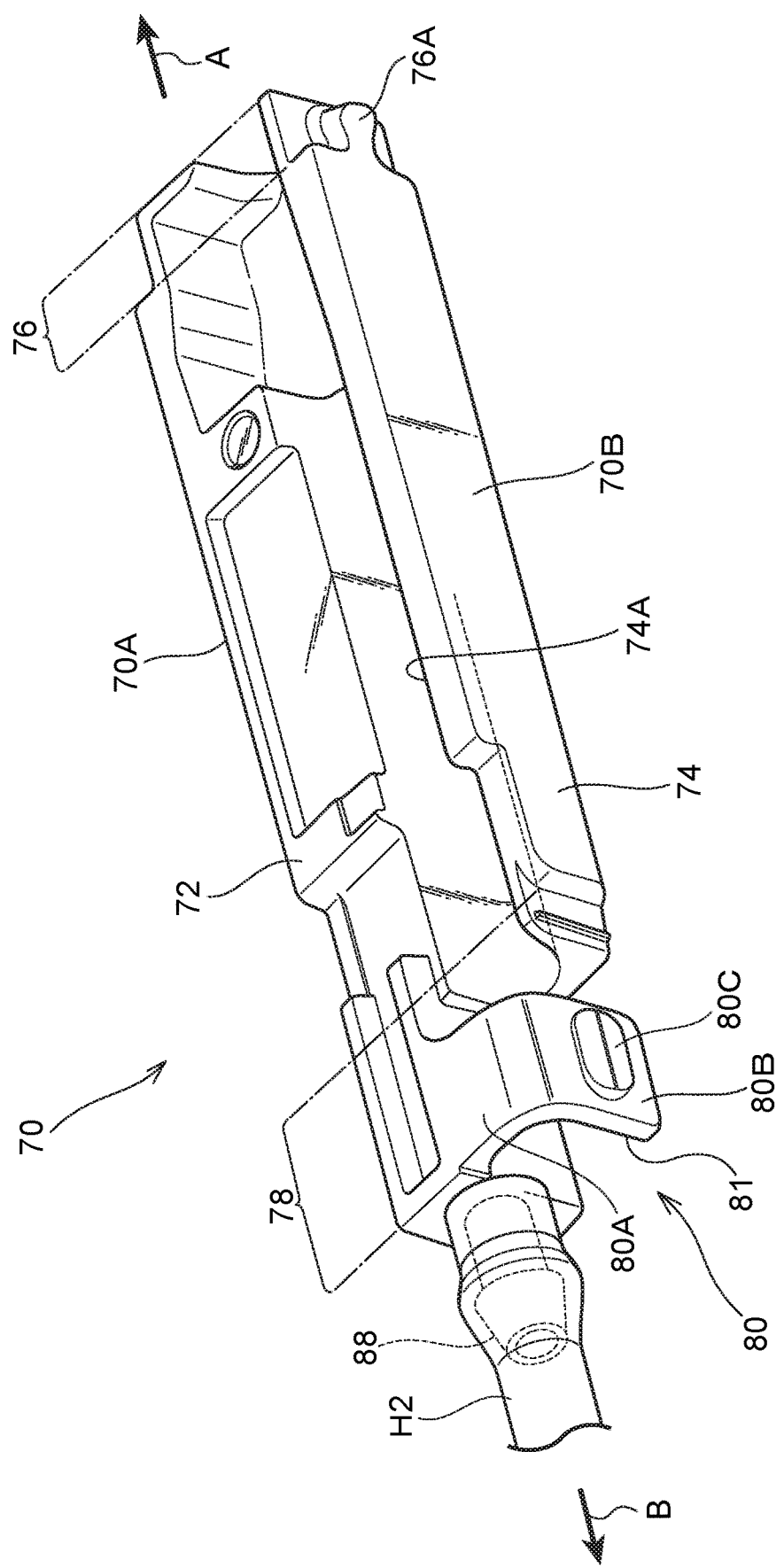
FIG. 10 is a perspective view illustrating the sub nozzle illustrated in FIG. 9, as viewed from a base end side of the sub nozzle and an opposite side from a windshield glass.
Figure 11:
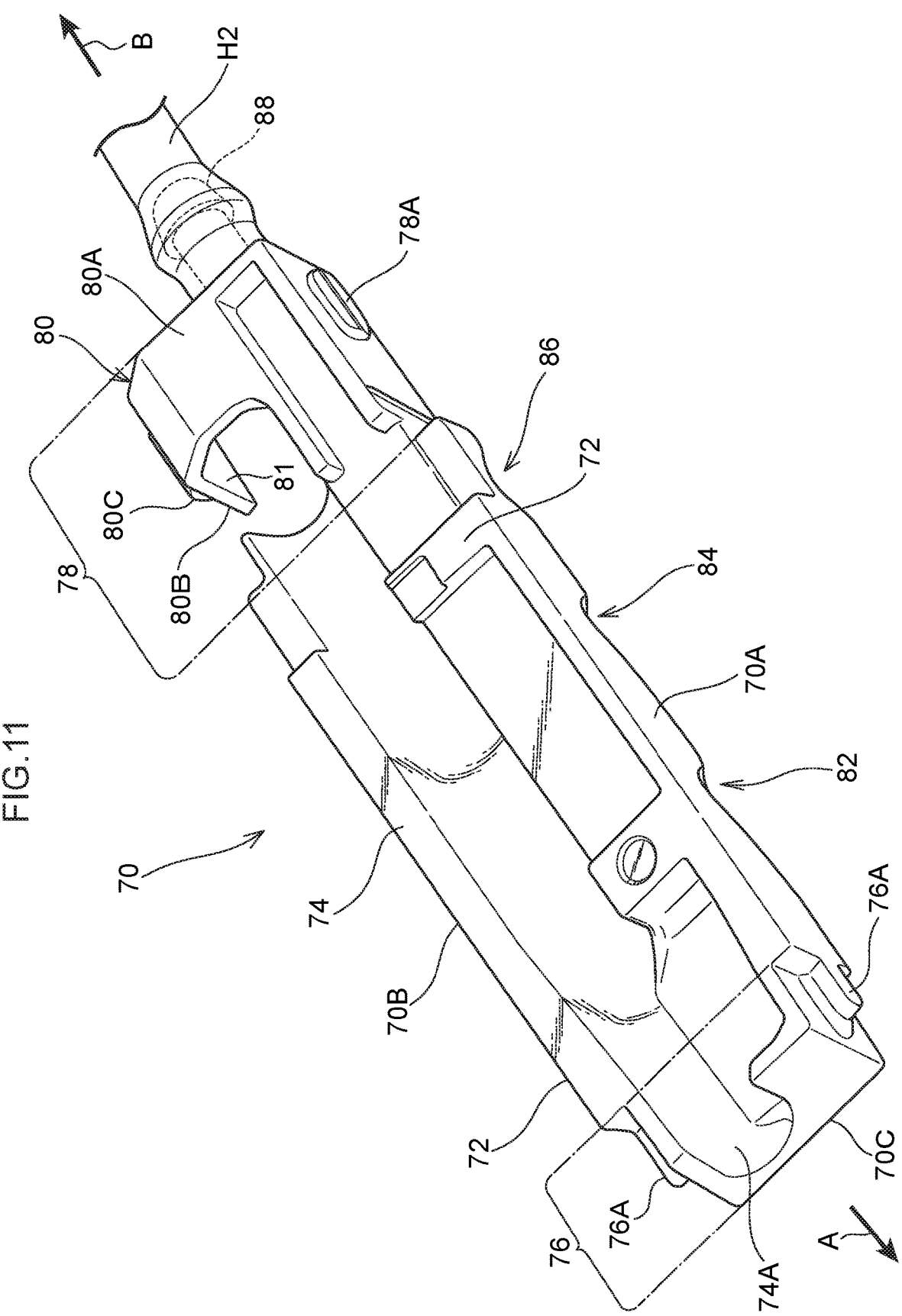
FIG. 11 is a perspective view illustrating the sub nozzle illustrated in FIG. 10, as viewed from a leading end side of the sub nozzle and an opposite side from a windshield glass.

As illustrated in FIG. 5 and FIG. 8, the sub nozzle unit 70 is attached to the retainer 20 so as to be adjacent to the arm lower side of the swaged portion 22 of the retainer 20 at the opposite side from the top wall 20A, and so as to be disposed facing the swaged walls 22A in the plate thickness direction of the top wall 20A. The sub nozzle unit 70 is thus disposed on the other side in the swing direction (return movement side of the wiper arm 12) of a base end side portion of the wiper blade 50 (see FIG. 13). The sub nozzle unit 70 is made from resin, is formed in a rectangular block shape, and extends along the length direction of the retainer 20. Specifically, in an attached state of the sub nozzle unit 70, an upper face of the sub nozzle unit 70 is disposed facing the swaged portion 22 of the retainer 20. Moreover, width direction side faces 70A, 70B of the sub nozzle unit 70 are disposed substantially in the same planes as outside faces of the side walls 20B, 20C of the retainer 20. Namely, in the attached state of the sub nozzle unit 70, the side faces 70A, 70B are exposed at both sides in the width direction of the retainer 20, and together with the side walls 20B, 20C of the retainer 20 configure external faces of the wiper arm 12. A lower face 70C of the sub nozzle unit 70 that is exposed at the WS glass G side is disposed substantially in the same plane as lower end faces of the side walls 20B, 20C of the retainer 20, and the sub nozzle unit 70 is configured so as not to project any further toward the WS glass G side than the side walls 20B, 20C of the retainer 20.

Moreover, as described above, the top wall 20A is inclined at an angle of approximately 45° with respect to the WS glass G at the leading end side portion of the retainer 20. Accordingly, in the attached state of the sub nozzle unit 70, a corner 70D configuring a boundary between the side face 70A and the lower face 70C of the sub nozzle unit 70 is disposed so as to configure a lower end portion of the sub nozzle unit 70, and is disposed facing the WS glass G in the arm up-down direction (see FIG. 1). In other words, in the attached state of the sub nozzle unit 70, the corner 70D is disposed at a position close to the WS glass G and the wiper blade 50.

As illustrated in FIG. 8 to FIG. 12, the sub nozzle unit 70 is configured including a sub nozzle body 72 forming one side portion in a width direction of the sub nozzle unit 70 (at the side of the side wall 20C of the retainer 20), and a hose routing portion 74 forming a portion at another side in the width direction of the sub nozzle unit 70 (at the side of the side wall 20B of the retainer 20). A base end portion of the sub nozzle body 72 projects further toward the arm base end side than a base end portion of the hose routing portion 74.

A leading end portion of the sub nozzle unit 70 forms a leading end side insertion portion 76. A width dimension of the leading end side insertion portion 76 is set so as to be smaller than a width dimension of a length direction intermediate portion of the sub nozzle unit 70. Specifically, the width dimension of the leading end side insertion portion 76 is set slightly smaller than a distance between the side walls 20B, 20C of the retainer 20, where the anchor grooves 20D are formed. The leading end side insertion portion 76 is inserted, from the arm base end side, between the side walls 20B, 20C of the retainer 20 formed with the anchor grooves 20D, such that the leading end side insertion portion 76 is disposed at the width direction inner side of the side walls 20B, 20C so as to be adjacent to the side walls 20B, 20C (see FIG. 8). Movement of the leading end portion of the sub nozzle unit 70 in the width direction is thus restricted by the side walls 20B, 20C. In other words, the leading end portion of the sub nozzle unit 70 is supported by the side walls 20B, 20C in the width direction of the retainer 20.

Anchor portions 76A are formed at both side faces in the width direction of the leading end side insertion portion 76 at positions corresponding to the respective anchor grooves 20D of the retainer 20. The anchor portions 76A each extend along the length direction of the sub nozzle unit 70. A base end portion of each anchor portion 76A is connected to the side face 70A or 70B of the sub nozzle unit 70, and a side face of each anchor portion 76A is disposed in the same plane as the side face 70A or 70B. The anchor portions 76A are inserted into the anchor grooves 20D from the arm base end side, and are thereby anchored to the anchor grooves 20D. Movement of the leading end portion of the sub nozzle unit 70 toward the leading end side and in the arm up-down direction is thereby restricted by the anchor grooves 20D (see FIG. 8).

A base end portion of the sub nozzle unit 70 forms a base end side insertion portion 78. A width dimension of the base end side insertion portion 78 is set so as to be substantially the same as the width dimension of the leading end side insertion portion 76. Specifically, the width dimension of the base end side insertion portion 78 is set slightly smaller than the distance between the side walls 20B, 20C of the retainer 20 where the anchor holes 20E are formed. The base end side insertion portion 78 is inserted between the side walls 20B, 20C of the retainer 20 formed with the anchor holes 20E from the open side of the retainer 20, such that the base end side insertion portion 78 is disposed at the width direction inner side of the side walls 20B, 20C so as to be adjacent to the side walls 20B, 20C (see FIG. 8). Movement of the base end portion of the sub nozzle unit 70 in the width direction is thus restricted by the side walls 20B, 20C. In other words, the base end portion of the sub nozzle unit 70 is supported by the side walls 20B, 20C in the width direction of the retainer 20. A first anchor claw 78A, serving as an anchor claw, is integrally formed at a side face of the sub nozzle body 72 at the base end side insertion portion 78. A position of the first anchor claw 78A corresponds to the anchor hole 20E formed through the side wall 20C of the retainer 20 described above. The first anchor claw 78A is fitted into and anchored to the anchor hole 20E (see FIG. 8).

The base end portion of the sub nozzle body 72 is also integrally formed with an anchor tab 80 extending toward the other side in the width direction. The anchor tab 80 includes a first anchor tab 80A and a second anchor tab 80B. The first anchor tab 80A has a plate thickness direction in the arm up-down direction, and extends from an upper end portion of the base end portion of the sub nozzle body 72 toward the other side in the width direction (the side wall 20B side). The second anchor tab 80B extends from a leading end of the first anchor tab 80A toward the arm lower side (WS glass G side). The anchor tab 80 is resiliently deformable in the width direction of the sub nozzle unit 70, and the second anchor tab 80B is disposed so as to substantially make tight contact with the width direction inner side face of the side wall 20B. The anchor tab 80 thereby absorbs width direction play at the base end portion of the sub nozzle body 72. Moreover, due to forming the sub nozzle body 72 with the anchor tab 80, a base end side hose groove 81, serving as a second hose routing groove opening toward the open side of the retainer 20, is formed at the base end portion of the sub nozzle body 72. A width dimension of the base end side hose groove 81 is set slightly larger than the diameter of the main nozzle hose H1, described later, and the main nozzle hose H1 is routed through the base end side hose groove 81.

The second anchor tab 80B is integrally formed with a second anchor claw 80C, serving as an anchor claw, at a position corresponding to the anchor hole 20E formed at the side wall 20B, described previously. The second anchor claw 80C projects further from the second anchor tab 80B toward the side wall 20B side, and is fitted into and engaged with the anchor hole 20E (see FIG. 13). The first anchor claw 78A and the second anchor claw 80C thereby restrict movement of the base end portion of the sub nozzle unit 70 in the arm up-down direction and the arm length direction.

Figure 12:
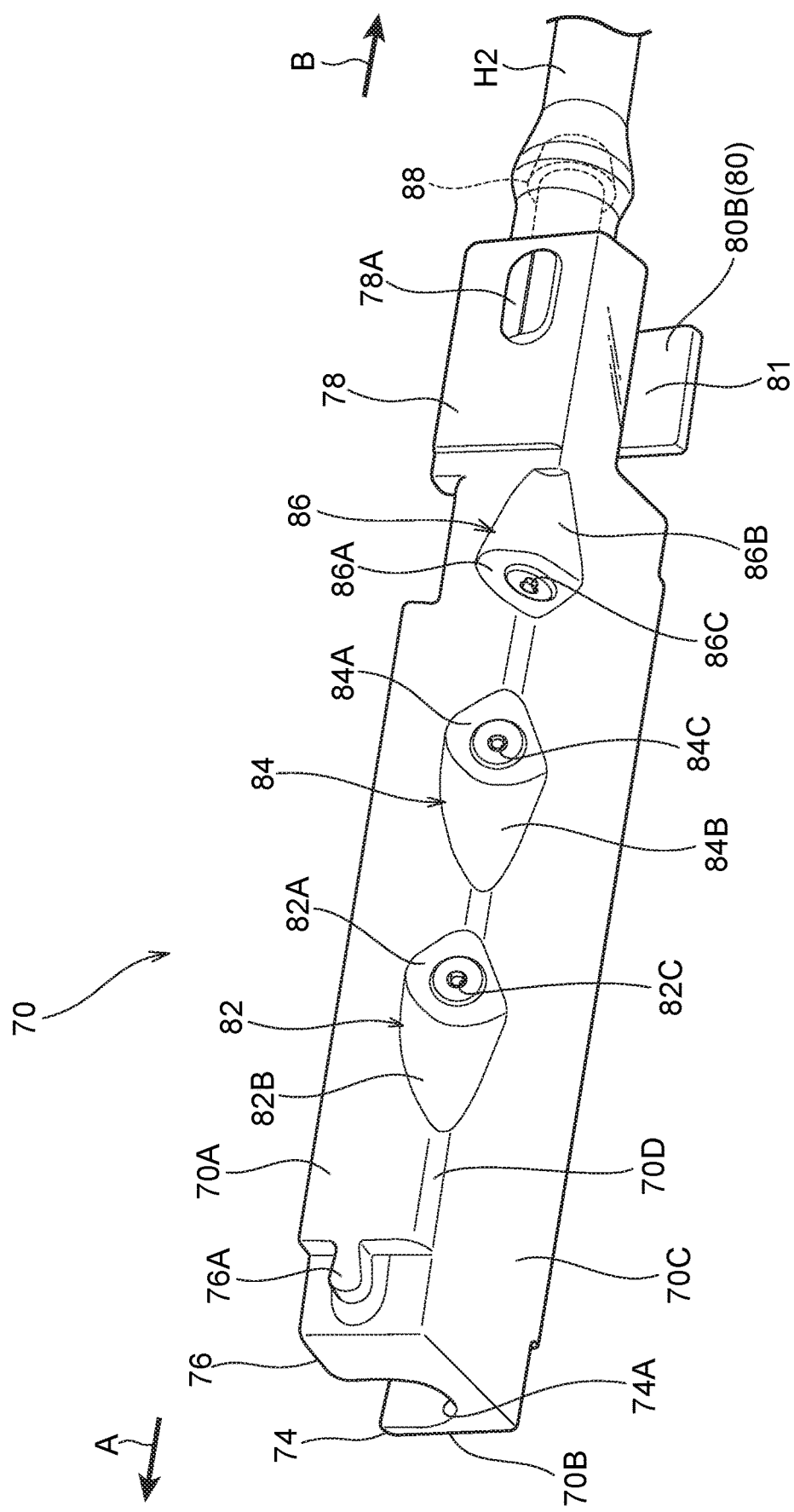
FIG. 12 is a perspective view illustrating the sub nozzle illustrated in FIG. 11, as viewed from the windshield glass side.

As illustrated in FIG. 8 and FIG. 12, the sub nozzle body 72 is formed with plural (three in the present exemplary embodiment) sub nozzles: a first sub nozzle 82, a second sub nozzle 84, and a third sub nozzle 86, at the corner 70D configuring the boundary between the side face 70A (the surface on the return movement side of the wiper arm 12 in the attached state of the wiper arm 12 to the retainer 20) and the lower face 70C of the sub nozzle body 72. The first sub nozzle 82 to the third sub nozzle 86 are formed with recessed profiles as if substantially V-shapes had been carved out from the corner 70D, and the first sub nozzle 82 to the third sub nozzle 86 are disposed in a row along the length direction of the sub nozzle body 72, following a ridge line of the corner 70D.

The first sub nozzle 82 is formed at a leading end side portion of the corner 70D of the sub nozzle body 72. The first sub nozzle 82 is a substantially frustoconical cavity having a vertex at a leading end side of the sub nozzle body 72. A base end side face of the first sub nozzle 82 configures a first sub nozzle face 82A, and in the attached state of the sub nozzle unit 70, the first sub nozzle face 82A is disposed so as to face the arm lower side and a leading end side of the wiper blade 50. A leading end side face of the first sub nozzle 82 configures a first cavity face 82B. The first cavity face 82B is formed as a substantially circular arc shaped curved face as viewed along a direction orthogonal to the first sub nozzle face 82A. The first sub nozzle face 82A is also formed with a first sub nozzle jet opening 82C, serving as a jet opening. Cleaning fluid is jetted through the first sub nozzle jet opening 82C. Specifically, cleaning fluid is jetted through the first sub nozzle jet opening 82C toward the arm lower side and the leading end side of the wiper blade 50 at the return movement side of the wiper blade 50.

The second sub nozzle 84 is formed at a length direction intermediate portion of the corner 70D of the sub nozzle body 72, and is disposed further toward the base end side from the first sub nozzle 82. The second sub nozzle 84 is configured similarly to the first sub nozzle 82. Namely, the second sub nozzle 84 is a substantially frustoconical cavity having a vertex at a leading end side of the sub nozzle body 72. A base end side face of the second sub nozzle 84 configures a second sub nozzle face 84A, and in the attached state of the sub nozzle unit 70, the second sub nozzle face 84A is disposed so as to face toward the arm lower side and the leading end side of the wiper blade 50. A leading end side face of the second sub nozzle 84 configures a second cavity face 84B. The second cavity face 84B is formed as a substantially circular arc shaped curved face as viewed along a direction orthogonal to the second sub nozzle face 84A. The second sub nozzle face 84A is also formed with a second sub nozzle jet opening 84C, serving as a jet opening. Cleaning fluid is jetted through the second sub nozzle jet opening 84C. Specifically, cleaning fluid is jetted through the second sub nozzle jet opening 84C toward the arm lower side and the leading end side of the wiper blade 50 at the return movement side of the wiper blade 50.

The third sub nozzle 86 is formed at a base end side portion of the corner 70D of the sub nozzle body 72, and is disposed further toward the base end side from the second sub nozzle 84. The third sub nozzle 86 is a substantially frustoconical cavity having a vertex at a base end side of the sub nozzle body 72. A leading end side face of the third sub nozzle 86 configures a third sub nozzle face 86A, and in the attached state of the sub nozzle unit 70, the third sub nozzle face 86A is disposed so as to face toward the arm lower side and the base end side of the wiper blade 50. A base end side face of the third sub nozzle 86 configures a third cavity face 86B. The third cavity face 86B is formed as a substantially circular arc shaped curved face as viewed along a direction orthogonal to the third sub nozzle face 86A. The third sub nozzle face 86A is also formed with a third sub nozzle jet opening 86C, serving as a jet opening. Cleaning fluid is jetted toward the third sub nozzle jet opening 86C. Specifically, cleaning fluid is jetted through the third sub nozzle jet opening 86C toward the arm lower side and the base end side of the wiper blade 50 at the return movement side of the wiper blade 50. As described above, the sub nozzle unit 70 is set so as to jet cleaning fluid through the first sub nozzle jet opening 82C and the second sub nozzle jet opening 84C toward the leading end side of the wiper blade 50, and to jet cleaning fluid through the third sub nozzle jet opening 86C toward the base end side of the wiper blade 50, at the return movement side of the wiper blade 50.

A sub hose joint 88 is integrally formed at a base end portion of the sub nozzle body 72. The sub hose joint 88 is substantially circular cylinder shaped, and projects from the base end portion of the sub nozzle body 72 toward the arm base end side. A flow path configured inside the sub hose joint 88 is in communication with the openings of the first sub nozzle jet opening 82C to the third sub nozzle jet opening 86C described above.

One end portion of the sub nozzle hose H2 is connected to the sub hose joint 88 in order to supply cleaning fluid to the sub nozzle unit 70. As illustrated in FIG. 5, the sub nozzle hose H2 extends from the sub hose joint 88 toward the arm base end side, and is routed inside the retainer 20. The sub nozzle hose H2 is routed between the compression spring 30 and the side wall 20C at the base end portion of the retainer 20 where the opening of the retainer 20 is closed off by the retainer cover 34, and is routed inside the arm head 14 described above. The other end portion of the sub nozzle hose H2 is connected to a vehicle sub washer pump (not illustrated in the drawings). Cleaning fluid conveyed under pressure from a vehicle washer tank (not illustrated in the drawings) by the sub washer pump is supplied to the sub nozzle unit 70.

Moreover, when jetting cleaning fluid through the first sub nozzle jet opening 82C to the third sub nozzle jet opening 86C, setting is made such that the cleaning fluid is jetted toward and lands on the WS glass G on the other side in the swing direction (return movement side) of the wiper blade 50. Specifically, as the wiper blade 50 swings back and forth, the cleaning fluid is jetted through the first sub nozzle jet opening 82C to the third sub nozzle jet opening 86C in the direction of progress of the wiper blade 50 as the wiper blade 50 swings toward the return movement side (arrow b direction in FIG. 3).

As illustrated in FIG. 8 to FIG. 12, the hose routing portion 74 of the sub nozzle unit 70 is formed with a leading end side hose groove 74A, serving as a first hose routing groove that penetrates the hose routing portion 74 in the length direction of the sub nozzle unit 70. The leading end side hose groove 74A is formed with a substantially U-shaped profile opening toward a side of the top wall 20A of the retainer 20 as viewed along the length direction of the sub nozzle unit 70. A width dimension of the leading end side hose groove 74A is set slightly larger than the diameter of the main nozzle hose H1, described later. In the attached state of the sub nozzle unit 70, the main nozzle hose H1 is routed through the leading end side hose groove 74A, and an opening of the leading end side hose groove 74A is closed off by the top wall 20A of the retainer 20.

Main Nozzle

Figure 13:
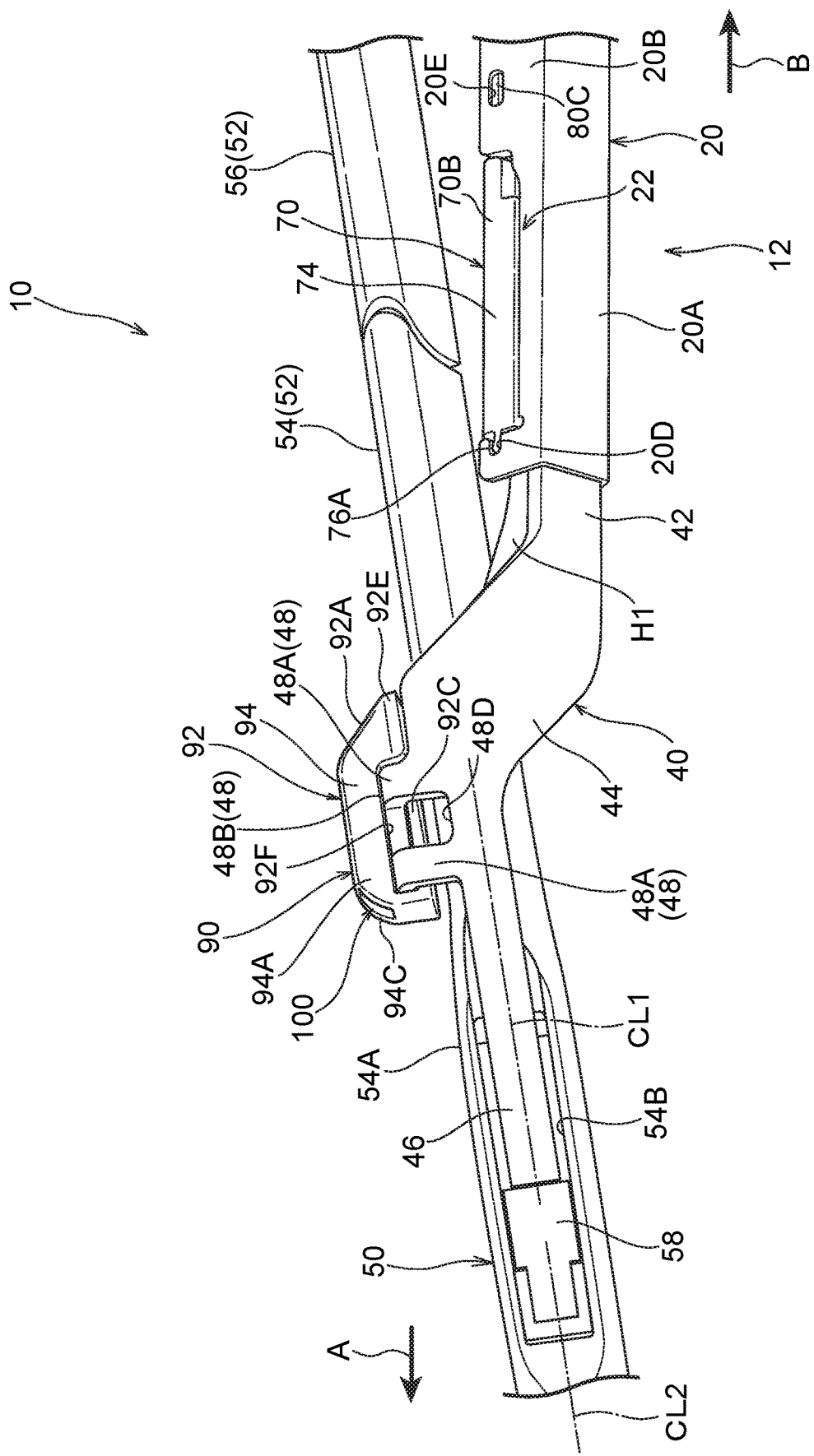
FIG. 13 is an enlarged perspective view illustrating an attached state of a main nozzle to an arm piece illustrated in FIG. 2, as viewed from an arm upper side.
Figure 14:
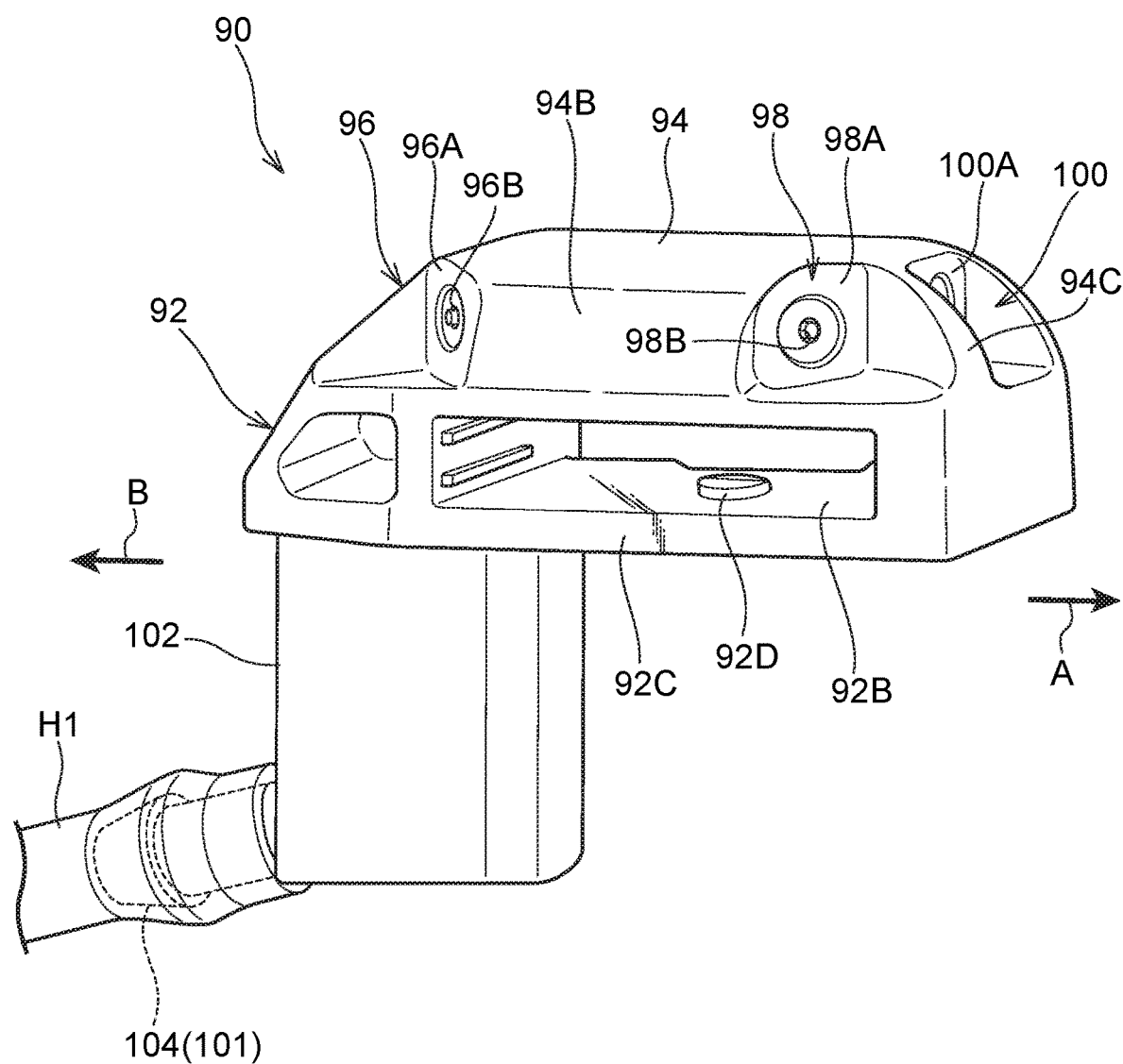
FIG. 14 is a perspective view illustrating the main nozzle illustrated in FIG. 13, as viewed from a windshield glass side.

As illustrated in FIG. 13, the main nozzle unit 90 is made from resin, and is attached to the hanging wall 48B of the arm piece 40. Part of the main nozzle unit 90 juts out toward the one side in the swing direction of the arm piece 40 (in other words, the downstream side of the induced airflow with respect to the wiper blade 50). Namely, the main nozzle unit 90 is disposed at the base end side of the protruding portion 54A of the main lever 54 of the wiper blade 50, and at the one side in the swing direction of the base end side portion of the main lever 54. The main nozzle unit 90 includes a main nozzle body 92, serving as a nozzle body, and a cleaning fluid supply section 101 (see FIG. 2, and FIG. 14 to FIG. 17) for supplying cleaning fluid to the main nozzle body 92.

The main nozzle body 92 is formed in an elongated substantially rectangular block shape extending along the length direction of the arm piece coupling portion 46 of the arm piece 40. A thickness direction of the main nozzle body 92 is aligned with the width direction of the arm piece coupling portion 46 (the swing direction of the wiper blade 50). Note that in the following explanation, one side in the thickness direction of the main nozzle body 92 corresponds to the one side in the swing direction of the wiper blade 50, and the other side in the thickness direction of the main nozzle body 92 corresponds to the other side in the swing direction of the wiper blade 50.

As illustrated in FIG. 2 and FIG. 14 to FIG. 18, an end face at a base end portion of the main nozzle body 92 configures an angled face 92A. The angled face 92A is angled toward the other side in the thickness direction (the arm piece 40 side) on progression toward the base end side in plan view. In an attached state of the main nozzle unit 90, the inclined face 92A is disposed in the same plane as a side face on the arm base end side of the crank portion 44 (see FIG. 13). The main nozzle body 92 is thus formed in a substantially trapezoidal shape in plan view, and is disposed on the one side in the swing direction (outward movement side) of the depression 54C of the wiper blade 50 described above (see the enlarged portion in FIG. 2).

An attachment hole 92B is formed penetrating the main nozzle body 92 in the arm up-down direction (height direction of the main nozzle body 92) at a portion on the other side in the thickness direction of the main nozzle body 92 (the side closer to the arm piece 40). The attachment hole 92B is formed in a substantially rectangular shape extending along a length direction of the main nozzle body 92, and a size of the attachment hole 92B is set slightly larger than the outer profile of the hanging wall 48B of the arm piece 40.

The hanging wall 48B is inserted inside the attachment hole 92B from the upper side of the main nozzle body 92, such that the main nozzle unit 90 is attached to the arm piece 40 in a state in which the hanging wall 48B is fitted into the attachment hole 92B (see FIG. 13 and FIG. 18).

A side wall configuring an inner peripheral face of the attachment hole 92B and an end portion on the other side in the thickness direction of the main nozzle body 92 configures an inside wall 92C. The inside wall 92C is formed with the fitting projection 92D (see FIG. 18B) at a position corresponding to the fitting hole 48C of the hanging wall 48B described above. The fitting projection 92D is formed in a substantially circular column shape with a low profile, and projects toward the inside of the attachment hole 92B. The fitting projection 92D is fitted into the fitting hole 48C of the hanging wall 48B. The hanging wall 48B is thus restricted from coming out of the attachment hole 92B. In other words, the main nozzle unit 90 is prevented from falling out of the hanging wall 48B toward the arm lower side (WS glass G side). Note that an upper portion of the attachment hole 92B is formed with an angled face 92D1. As viewed along the length direction of the main nozzle body 92, the angled face 92D1 is angled toward an inner peripheral face side of the attachment hole 92B on progression toward the arm upper side.

Figure 15:
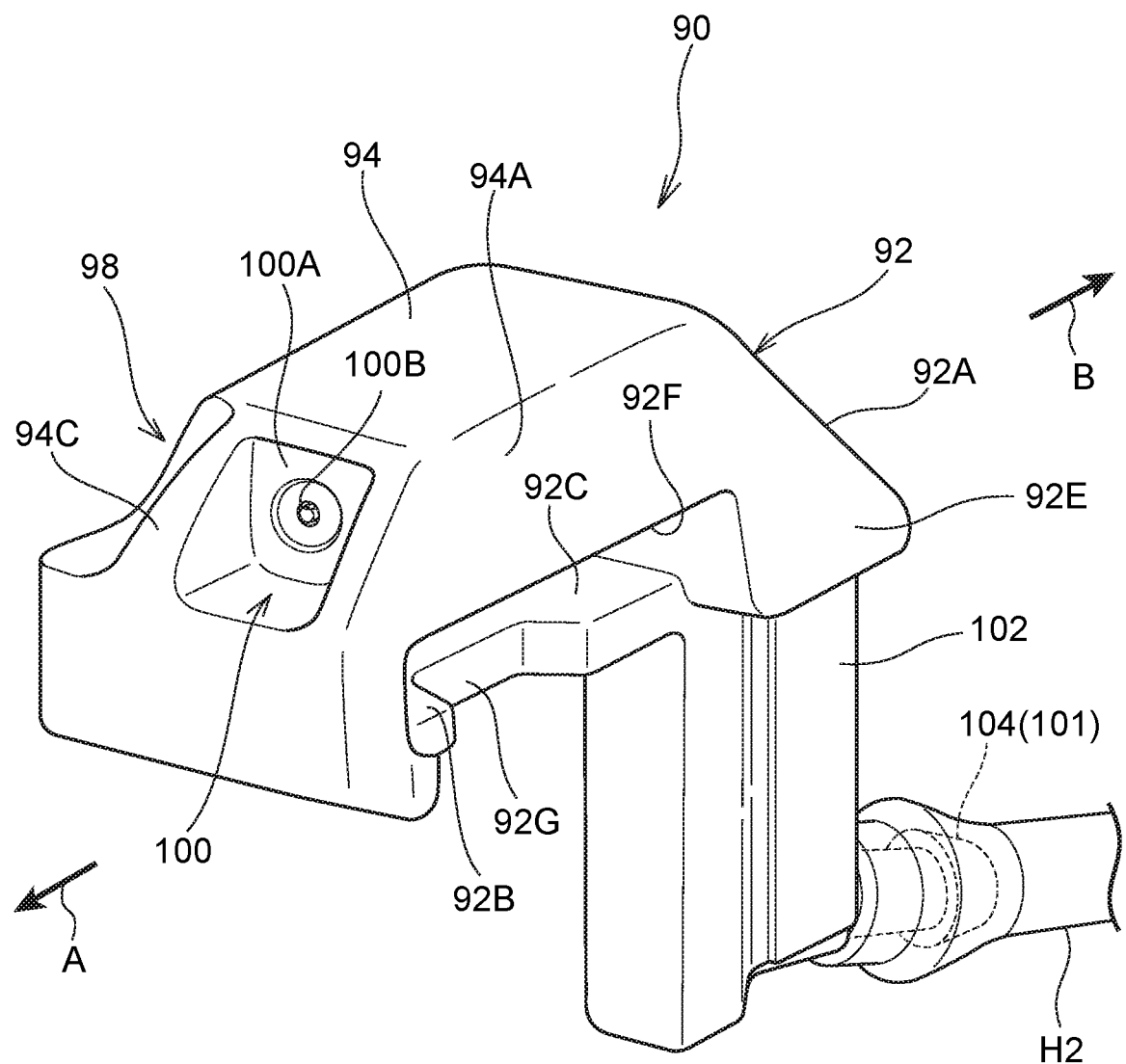
FIG. 15 is a perspective view illustrating the main nozzle illustrated in FIG. 14, as viewed from a leading end side of the main nozzle.
Figure 16:
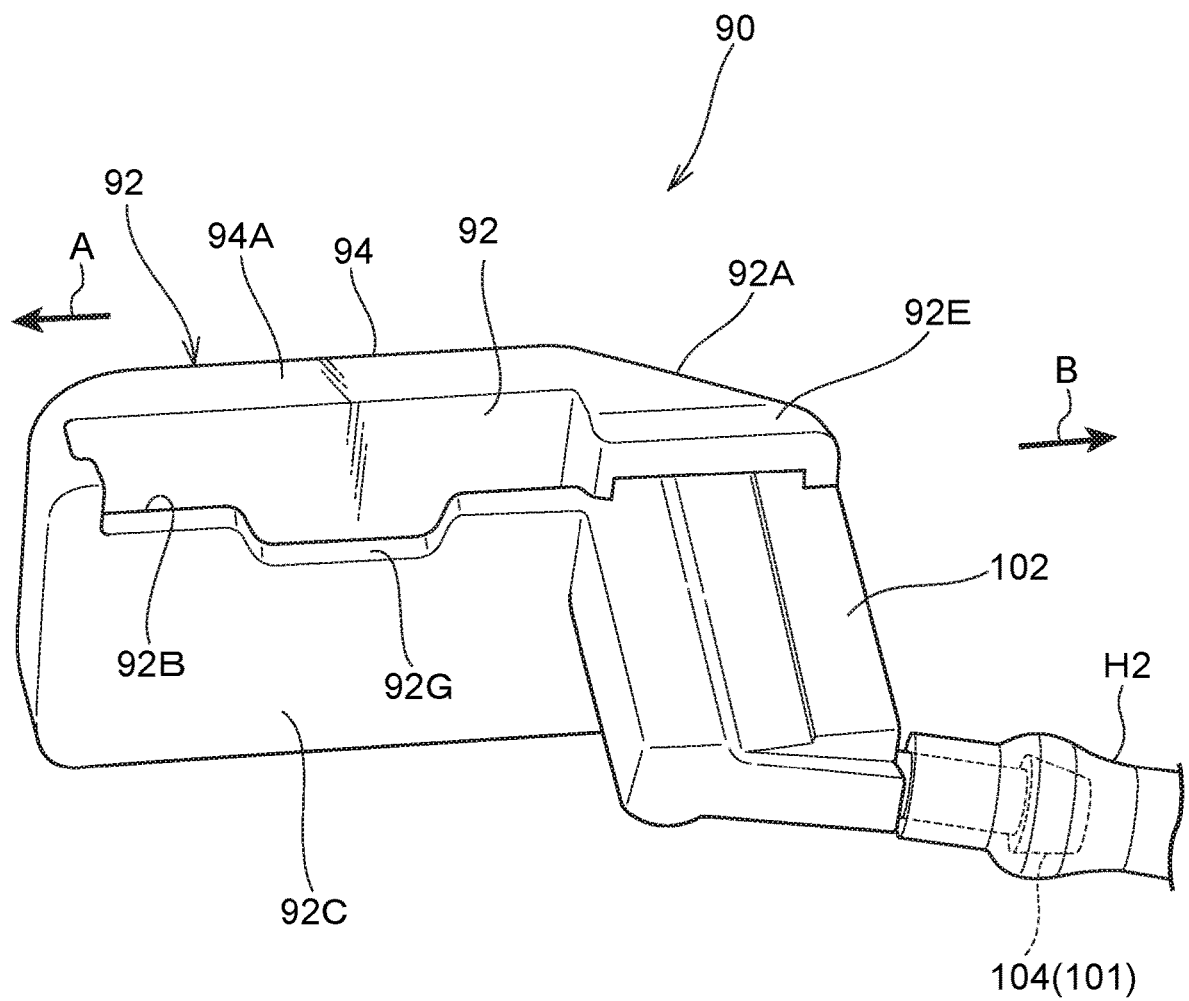
FIG. 16 is a perspective view illustrating the main nozzle illustrated in FIG. 14, as viewed from an inner side wall side of the main nozzle.
Figure 18A:
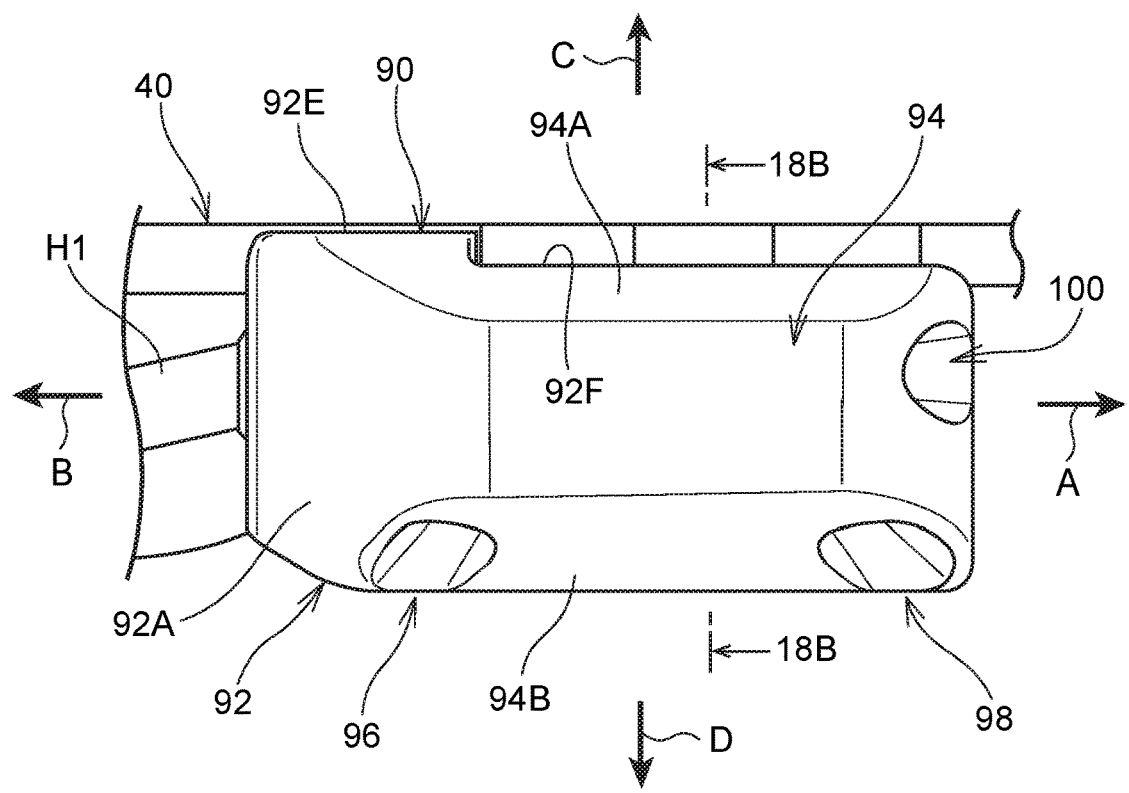
FIG. 18A is an enlarged side view illustrating an attached state of the main nozzle to the arm piece illustrated in FIG. 13.
Figure 18B:
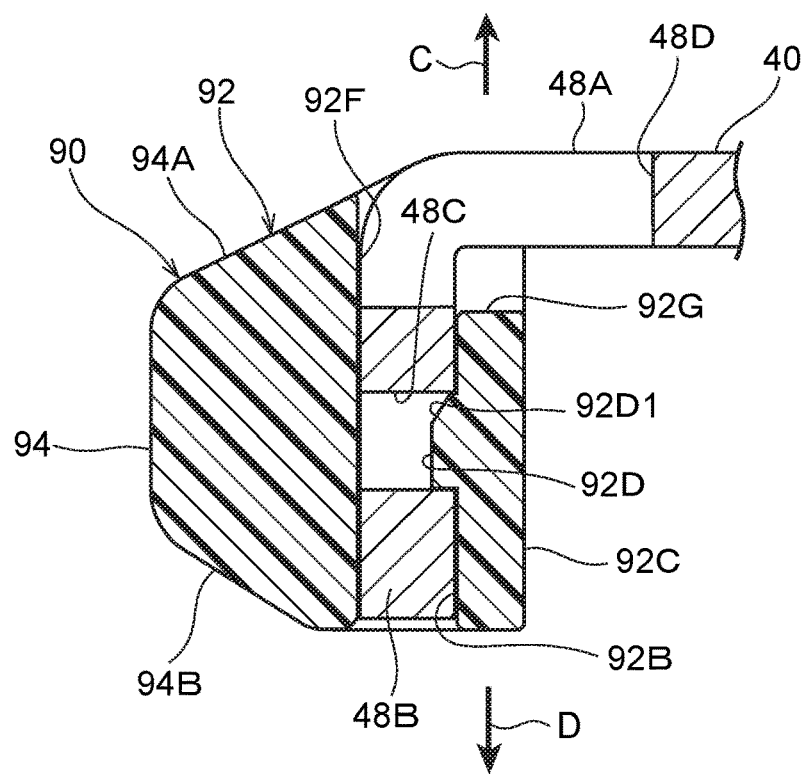
FIG. 18B is a cross-section taken along line 18B-18B in FIG. 18A.

As illustrated in FIG. 15, FIG. 16, and FIG. 18, an upper end portion of the inside wall 92C is disposed at a position slightly further toward the arm lower side from an upper end face 92E of the main nozzle body 92. A placement recess 92F opening toward the arm piece 40 side (the other side in the thickness direction) in plan view is thus formed at an upper end portion of the main nozzle body 92. The jutting-out wall 48A of the attachment wall 48 is disposed in a state housed inside the placement recess 92F (see FIG. 18B). Moreover, in the attached state of the main nozzle unit 90, the upper end face 92E of the main nozzle body 92 is disposed substantially in the same plane as an upper face of the crank portion 44 of the arm piece 40 (see FIG. 18A). A lower end position of the inside wall 92C is aligned with a lower end position of the hanging wall 48B in the arm up-down direction. Specifically, as illustrated in FIG. 1, a lower end position of the main nozzle unit 90 is set so as to be substantially aligned with the position of the corner 70D of the sub nozzle unit 70 previously described in the arm up-down direction. Namely, as viewed from the leading end side of the wiper blade 50, the sub nozzle unit 70 and the main nozzle unit 90 are disposed sandwiching the wiper blade 50.

Figure 19:
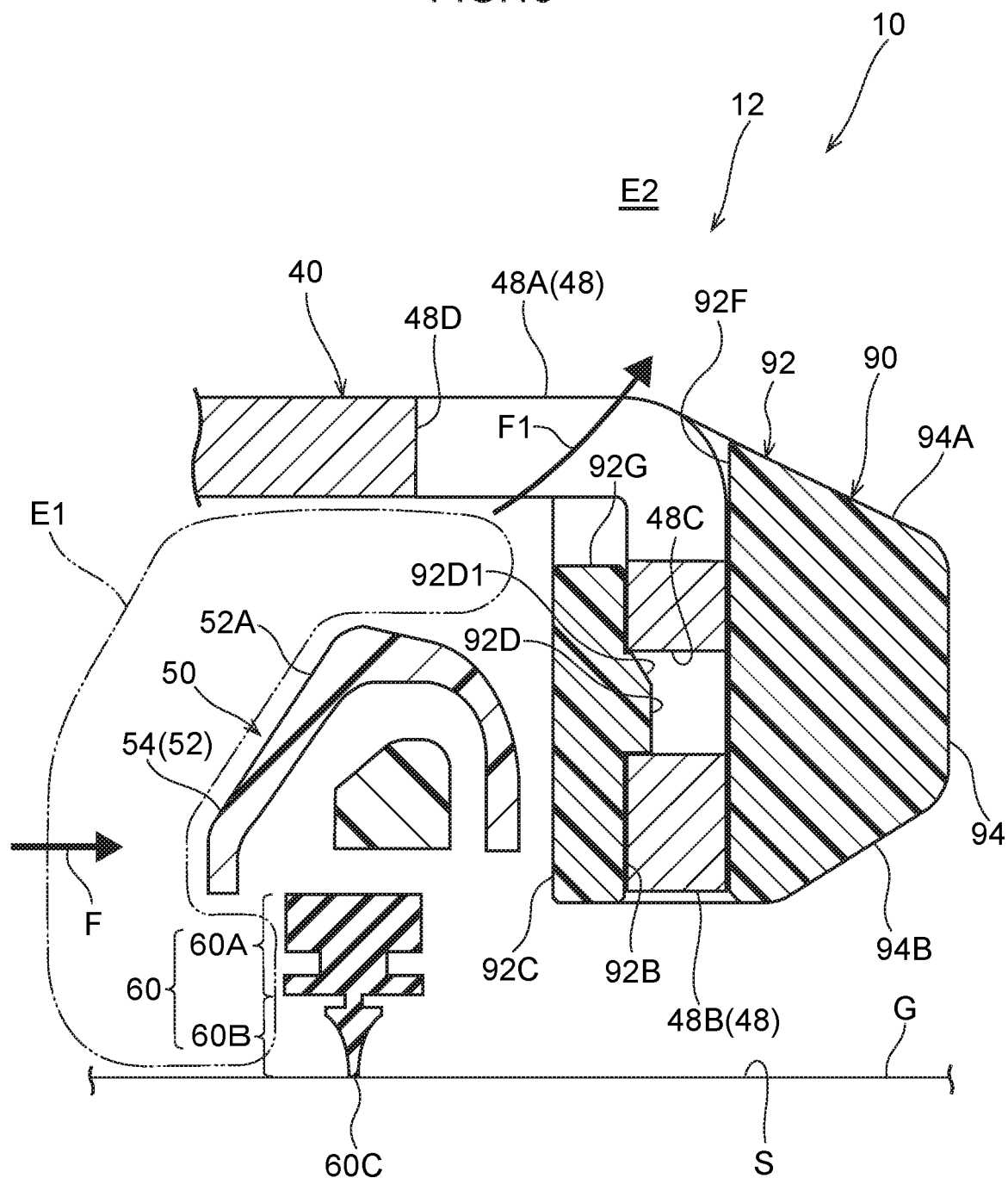
FIG. 19 is a cross-section to explain a positive pressure region at an inner side of a hanging wall illustrated in FIG. 18B.

Moreover, as illustrated in FIG. 15, FIG. 16, and FIG. 18B, an escape recess 92G opening toward the arm upper side is formed at an upper end portion of the inside wall 92C, at a position corresponding to the previously described escape hole 48D in the arm piece 40. A width dimension of the escape recess 92G is set to the same dimension as the width dimension of the escape hole 48D, and a lower end of the escape recess 92G is disposed at a position aligned with the lower end of the escape hole 48D. A space E1 (see FIG. 19) at the inner side of the attachment wall 48 (at the wiper blade 50 side) and a space E2 (see FIG. 19) at the outer side of the attachment wall 48 (at the opposite side from the wiper blade 50) are in communication with each other through the escape hole 48D and the escape recess 92G.

As illustrated in FIG. 14 to FIG. 18, a portion on one side in the thickness direction of the main nozzle body 92, specifically, a portion jutting out from the arm piece 40 (hanging wall 48B of the attachment wall 48) toward the one side in the swing direction configures a nozzle protrusion 94.

The nozzle protrusion 94 is disposed at the one side in the swing direction of the wiper blade 50. An upper face 94A and a lower face 94B of the nozzle protrusion 94 are angled so as to approach each other on progression toward the one side in the thickness direction (the side toward which the nozzle protrusion 94 protrudes). The nozzle protrusion 94 is thus formed with a substantially trapezoidal shape as viewed along the length direction of the main nozzle body 92. A leading end face 94C of the nozzle protrusion 94 is curved so as to have a substantially circular arc profile in plan view. The nozzle protrusion 94 is formed with plural (three in the present exemplary embodiment) main nozzles to jet cleaning fluid onto the WS glass G: a first main nozzle 96, a second main nozzle 98, and a third main nozzle 100.

The first main nozzle 96 is formed at a base end side portion of the lower face 94B of the nozzle protrusion 94. The first main nozzle 96 is formed with a recessed profile opening toward the arm lower side at the base end side of the main nozzle body 92, and opening toward the one side in the thickness direction of the main nozzle body 92. A top face of the first main nozzle 96 configures a first main nozzle face 96A. The first main nozzle face 96A is disposed facing the arm lower side and the base end side of the main nozzle body 92. The first main nozzle face 96A is formed with a first main nozzle jet opening 96B (an element broadly understood as a jet opening), and at the outward movement side of the wiper blade 50, cleaning fluid is jetted toward the arm lower side and the arm base end side through the first main nozzle jet opening 96B.

The second main nozzle 98 is formed at a leading end side portion of the lower face 94B of the nozzle protrusion 94. The second main nozzle 98 is formed with a recessed profile opening toward the arm lower side and the leading end side of the main nozzle body 92, and opening toward the one side in the thickness direction of the main nozzle body 92. A top face of the second main nozzle 98 configures a second main nozzle face 98A. The second main nozzle face 98A is disposed facing the arm lower side at the leading end side of the main nozzle body 92. The second main nozzle face 98A is formed with a second main nozzle jet opening 98B (an element broadly understood as a jet opening), and at the outward movement side of the wiper blade 50, cleaning fluid is jetted toward the arm lower side and the arm leading end side through the second main nozzle jet opening 98B.

The third main nozzle 100 is formed at the leading end face 94C of the nozzle protrusion 94, at the arm upper side of the second main nozzle 98. The third main nozzle 100 is formed with a recessed profile opening toward the one side in the thickness direction side of the main nozzle body 92 and the leading end side of the main nozzle unit 90. A base end side face of the third main nozzle 100 configures a third main nozzle face 100A. The third main nozzle face 100A is formed with a third main nozzle jet opening 100B (an element broadly understood as a jet opening), and at the outward movement side of the wiper blade 50, cleaning fluid is jetted toward the arm leading end side through the third main nozzle jet opening 100B. As described above, in the main nozzle unit 90, cleaning fluid is jetted toward the arm base end side through the first main nozzle jet opening 96B, and cleaning fluid is jetted toward the arm leading end side through the second main nozzle jet opening 98B and the third main nozzle jet opening 100B, these being at the outward movement side of the wiper blade 50.

The cleaning fluid supply section 101 is configured including a main nozzle coupler 102, serving as a coupler, and a main hose joint 104, serving as a joint. The main nozzle coupler 102 is formed in a substantially rectangular block shape extending along the length direction of the main nozzle body 92, and projects (extends) from a base end portion of the main nozzle body 92 (a portion on the arm piece 40 base end side of the hanging wall 48B) toward the other side in the thickness direction (return movement side of the wiper blade 50). Specifically, the main nozzle coupler 102 is disposed adjacent to an arm lower side (WS glass G side) of a portion of the arm piece 40 located further toward the arm leading end side from the bend 44A of the crank portion 44, and abuts the crank portion 44 (see FIG. 1 and FIG. 5). In plan view, the main nozzle coupler 102 is disposed at a position overlapping with the depression 54C of the wiper blade 50 previously described, and is disposed inside the depression 54C so as to cut across the depression 54C in the width direction of the lever unit 52 (see the enlarged portion in FIG. 1). The depression 54C thereby suppresses interference between the main nozzle coupler 102 and the wiper blade 50.

The main hose joint 104 is integrally formed to a leading end portion of the main nozzle coupler 102. The main hose joint 104 is formed in a substantially circular cylinder shape, and extends from the leading end portion of the main nozzle coupler 102 toward the arm base end side. Specifically, in plan view, the main hose joint 104 is disposed at a position overlapping the crank portion 44 of the arm piece 40, and is covered from the arm upper side by the crank portion 44. A flow path configuring the interior of the main hose joint 104 is in communication with the openings of the first main nozzle jet opening 96B to the third main nozzle jet opening 100B described above.

One end portion of the main nozzle hose H1 for supplying cleaning fluid to the main nozzle unit 90 is connected to the main hose joint 104. As illustrated in FIG. 5, the main nozzle hose H1 extends from the main hose joint 104 toward the arm base end side at the arm lower side of the arm piece 40 (the crank portion 44 and the arm piece fixing portion 42), and is disposed inside the retainer 20 and the arm head 14. The main nozzle hose H1 is disposed at the return movement side of the wiper blade 50 (the opposite side from the main nozzle body 92), and is routed along the length direction of the wiper arm 12. Specifically, the main nozzle hose H1 is routed inside the leading end side hose groove 74A of the sub nozzle unit 70 and the base end side hose groove 81 previously described, and extends from the sub nozzle unit 70 toward the arm base end side. The main nozzle hose H1 is also routed between the compression spring 30 and the side wall 20B at the base end portion of the retainer 20 where the opening of the retainer 20 is closed off by the retainer cover 34, and is routed inside the arm head 14 described above. The other end portion of the main nozzle hose H1 is connected to a vehicle main washer pump (not illustrated in the drawings). Cleaning fluid conveyed under pressure from the vehicle washer tank (not illustrated in the drawings) by the main washer pump is supplied to the main nozzle unit 90.

Moreover, when jetting cleaning fluid through the first main nozzle jet opening 96B to the third main nozzle jet opening 100B of the main nozzle unit 90, the cleaning fluid is jetted toward and lands on the WS glass G at the one side in the swing direction (outward movement side) of the wiper blade 50. Specifically, as the wiper blade 50 swings back and forth, the cleaning fluid is jetted in the direction of progress of the wiper blade 50 through the first main nozzle jet opening 96B to the third main nozzle jet opening 100B as the wiper blade 50 swings toward the outward movement side (arrow a direction side in FIG. 3).

Note that the first to third main nozzle jet openings 96B, 98B, 100B of the main nozzle unit 90, and the first to third sub nozzle jet openings 82C, 84C, 86C of the sub nozzle unit 70, are each configured by a metal sphere formed with a jet opening (nozzle jet). The first to third main nozzle jet openings 96B, 98B, 100B and the first to third sub nozzle jet openings 82C, 84C, 86C are fitted and retained in spherically-recessed retention portions formed at the first to third main nozzles 96, 98, 100 and the first to third sub nozzles 82, 84, 86 such that the nozzle jets are watertight and capable of rolling, enabling the angles of the respective jet openings to be adjusted.

Next, explanation follows regarding operation and advantageous effects of the present exemplary embodiment.

In the vehicle wiper device 10 configured as described above, the main nozzle unit 90 and the sub nozzle unit 70 are attached to the wiper arm 12. A non-illustrated vehicle washer switch is turned ON when jetting (supplying) cleaning fluid onto the wiped surface S of the WS glass G and wiping the wiped surface S with the wiper blade 50. The wiper arm 12 (wiper blade 50) swings back and forth between the rest position and the return position, and cleaning fluid is supplied to the wiped surface S of the WS glass G from the main nozzle unit 90 and the sub nozzle unit 70. Specifically, as the wiper arm 12 (wiper blade 50) swings toward the outward movement side (one side in the swing direction side), cleaning fluid is jetted in the direction of progress of the wiper blade 50 through the first main nozzle jet opening 96B to the third main nozzle jet opening 100B of the main nozzle unit 90. As the wiper arm 12 (wiper blade 50) swings toward the return movement side (other side in the swing direction), cleaning fluid is jetted in the direction of progress of the wiper blade 50 through the first sub nozzle jet opening 82C to the third sub nozzle jet opening 86C of the sub nozzle unit 70. In this manner, cleaning fluid is jetted in the direction of progress of the wiper blade 50 as the wiper arm 12 swings, enabling good quality wiping of the wiped surface S of the WS glass G by the wiper blade 50.

A leading end side portion of the wiper arm 12 is configured by the arm piece 40, and the main nozzle unit 90 is attached to the attachment wall 48 (hanging wall 48B) of the arm piece 40. The nozzle protrusion 94 that includes the first main nozzle jet opening 96B to the third main nozzle jet opening 100B protrudes from the arm piece 40 toward the outward movement side of the wiper arm 12, and is disposed on the outward movement side of the wiper arm 12 with respect to the wiper blade 50. Namely, relative to the wiper blade 50, the nozzle protrusion 94 is disposed on the downstream side of an airflow (induced airflow) that blows upward along the WS glass G (see arrow F in FIG. 1 and FIG. 19). Accordingly, cleaning fluid jetted from the nozzle protrusion 94 can be shielded from the airflow blowing upward along the WS glass G by the wiper blade 50. This thereby enables the airflow to be suppressed from affecting the cleaning fluid jetted through the first main nozzle jet opening 96B to the third main nozzle jet opening 100B.

Moreover, as described above, the main nozzle unit 90 is attached to the hanging wall 48B that hangs down toward the WS glass G side from the arm piece 40 at a position on the outward movement side of the wiper blade 50, and the nozzle protrusion 94 is disposed on the opposite side of the hanging wall 48B from the wiper blade 50. This thereby enables the nozzle protrusion 94 to be disposed on the outward movement side of the wiper arm 12 relative to the wiper blade 50, while also disposing the nozzle protrusion 94 close to the WS glass G This thereby enables cleaning fluid to be efficiently supplied to the wiper blade 50 that wipes the WS glass G.

The main nozzle unit 90 is attached to the arm piece 40 in a state in which the hanging wall 48B is inserted and fitted inside the attachment hole 92B of the main nozzle unit 90. The hanging wall 48B can thus function as a core of the main nozzle unit 90. The main nozzle unit 90 can accordingly be supported by the hanging wall 48B, while load input to the main nozzle unit 90 is borne by the hanging wall 48B if, for example, the main nozzle unit 90 hits an obstacle on the WS glass G (example, frozen snow on the WS glass G) as the wiper arm 12 swings. This enables the attached state (orientation) of the main nozzle unit 90 to be well-maintained. Moreover, damage due to input load can also be suppressed at the main nozzle unit 90 that is made from resin.

The leading end (lower end) of the hanging wall 48B projects further toward the WS glass G side than the hook 46A of the arm piece 40. This thereby enables the main nozzle unit 90 to be attached to the hanging wall 48B while configuring a long extension length of the hanging wall 48B from the arm piece 40. This enables the main nozzle unit 90 to be disposed even closer to the WS glass G side, while suppressing rattling of the main nozzle unit 90 and the like in the attached state. As a result, the orientation of the main nozzle unit 90 can be stabilized by suppressing wobbling and the like of the main nozzle unit 90 when jetting cleaning fluid from the nozzle protrusion 94. The cleaning fluid jetted from the nozzle protrusion 94 can thus be made to land reliably at predetermined landing positions.

The base end side portion of the hanging wall 48B (specifically, the base end side portion of the attachment wall 48) is penetrated by the escape hole 48D. This thereby enables the wiping performance of the wiper blade 50 against the WS glass G to be maintained. Namely, since the hanging wall 48B is provided at the arm piece 40, an airflow that hits the wiper blade 50, blows up along the finned face 52A, and flows to the arm lower side of the arm piece 40 is blocked by the hanging wall 48B. This creates a positive pressure region in the space E1 (see FIG. 19) at the wiper blade 50 side of the hanging wall 48B, creating lifting force that acts on the arm piece 40. This lifting force acts in a direction to separate the wiper blade 50 from the WS glass which could be detrimental to the wiping performance of the wiper blade 50 against the WS glass G As a countermeasure to this, the escape hole 48D is formed penetrating the base end side portion of the hanging wall 48B, such that the airflow flowing to the arm lower side of the arm piece 40 flows through the escape hole 48D and out to the outer side of the hanging wall 48B (see arrow F1 in FIG. 19). This suppresses generating the high positive pressure region in the space E1 at the wiper blade 50 side of the hanging wall 48B, and enables lifting force to be suppressed from acting on the arm piece 40. This thereby enables wiping performance of the wiper blade 50 on the WS glass G to be maintained.

The attachment wall 48 of the arm piece 40 is configured by the jutting-out wall 48A that juts out toward the outward movement side of the wiper arm 12, and the hanging wall 48B that bends toward the arm lower side (WS glass G side) at the leading end portion of the jutting-out wall 48A. The jutting-out wall 48A thereby enables the hanging wall 48B to be disposed jutting out toward the outward movement side of the arm piece 40. Namely, the jutting-out wall 48A enables the hanging wall 48B to be separated from the wiper blade 50 by a predetermined distance toward the outward movement side. This thereby enables the hanging wall 48B and the main nozzle unit 90 to be suppressed from interfering with the wiper blade 50 (specifically, the protruding portion 54A of the main lever 54) when coupling the wiper blade 50 to the arm piece 40. This thereby enables the ease of attachment of the wiper blade 50 to be improved.

In the arm piece 40, the width dimensions of the crank portion 44 and the arm piece fixing portion 42 are set larger than the width dimension of the arm piece coupling portion 46. This thereby enables a base end side portion of the arm piece 40 to be configured with high bending rigidity.

The main nozzle unit 90 is disposed at the base end side of the protruding portion 54A of the main lever 54 of the wiper blade 50, and at the one side in the swing direction of the base end side portion of the main lever 54. This thereby enables the main nozzle unit 90 to be disposed close to the wiper blade 50 in the width direction of the wiper blade 50, while securing the protruding portion 54A with a sufficient width dimension to provide the coupling member 58 to the main lever 54.

The main nozzle coupler 102 of the main nozzle unit 90 is disposed adjacent to the WS glass G side face of the crank portion 44 of the arm piece 40. The main nozzle coupler 102 and the main nozzle hose H1 can therefore be covered from the arm upper side (opposite side from the WS glass G) by the crank portion 44. This thereby enables the main nozzle coupler 102 and the main nozzle hose H1 to be suppressed from being seen from the arm upper side (the opposite side from the WS glass G). This thereby enables the design aesthetic of the vehicle wiper device 10 to be enhanced. Moreover, as viewed from the arm leading end side of the retainer 20, the arm piece fixing portion 42 is inclined by approximately 45° with respect to the WS glass G so as to form an upward gradient with respect to the induced airflow. This thereby enables rattling and the like of the main nozzle hose H1 caused by the induced airflow to be suppressed.

Moreover, in the vehicle wiper device 10 configured as described above, the base end portion of the wiper blade 50 is disposed at the outward movement side (one side in the swing direction) of the wiper arm 12. The base end side portion of the wiper arm 12 (a portion not including the leading end portion) is thus disposed at the return movement side (other side in the swing direction) of the wiper blade 50. An increase in the size of the base end side of the wiper arm 12 (not including the arm piece coupling portion 46) in the height direction of the vehicle wiper device 10 can therefore be suppressed in comparison to configurations in which the base end side of the wiper arm 12 is disposed overlapping with the base end portion of the wiper blade 50 in plan view.

The cleaning fluid supply section 101 of the main nozzle unit 90 extends from the main nozzle body 92 attached to the arm piece 40 toward the return movement side of the wiper blade 50, and is positioned at the arm upper side of the main lever 54 of the wiper blade 50 (on the opposite side from the WS glass G). The cleaning fluid supply section 101 is thus disposed straddling the main lever 54. Moreover, the main nozzle hose H1 routed along the length direction of the wiper arm 12 is connected to the cleaning fluid supply section 101. This thereby enables the main nozzle body 92 and the main nozzle hose H1, which are disposed on opposite sides of the wiper blade 50 to each other in the swing direction of the wiper blade 50, to be connected by the cleaning fluid supply section 101 that straddles (extends across) the main lever 54.

Moreover, the main lever 54 of the wiper blade 50 is formed with the recessed depression 54C that opens toward the arm upper side (the opposite side from the WS glass G) in side view. The cleaning fluid supply section 101 is disposed within the depression 54C. This thereby enables the cleaning fluid supply section 101 to be disposed at a position close to the WS glass G side while suppressing interference between the wiper blade 50 and the cleaning fluid supply section 101, even when the cleaning fluid supply section 101 straddles the main lever 54. In other words, the wiper blade 50 and the cleaning fluid supply section 101 can be suppressed from interfering with each other, thereby enabling any obstruction to the swinging of the wiper blade 50 relative to the wiper arm 12 to be suppressed. In this manner, the effect of airflow can be suppressed while suppressing an increase in size in the height direction, even when the main nozzle body 92 is attached to the arm piece 40.

Moreover, the cleaning fluid supply section 101 of the main nozzle unit 90 includes the main hose joint 104 to which the one end portion of the main nozzle hose H1 is connected, and the main nozzle coupler 102 that couples the main hose joint 104 and the main nozzle body 92 together. The main nozzle coupler 102 is disposed inside the depression 54C of the main lever 54. Accordingly, when, for example, the wiper blade 50 is displaced toward the arm upper side (the main nozzle coupler 102 side) and interacts with the cleaning fluid supply section 101, the depression 54C of the wiper blade 50 interacts with the main nozzle coupler 102. In other words, the wiper blade 50 can be prevented from squashing the main nozzle hose H1 (including at the portion connected to the main hose joint 104). This thereby enables, for example, any obstruction to the flow of cleaning fluid in the main nozzle hose H1 to be prevented.

In the main nozzle unit 90, the main hose joint 104 is formed at the leading end portion of the main nozzle coupler 102 extending from the main nozzle body 92 toward the return movement side. The main hose joint 104 extends from the main nozzle coupler 102 toward the arm base end side. This thereby enables the main hose joint 104 to be disposed at a separation toward the return movement side of the wiper blade 50 with respect to the main nozzle body 92, while disposing the main nozzle body 92 at the outward movement side of the wiper blade 50. In other words, the main hose joint 104 can be disposed close to the one end portion of the main nozzle hose H1 that is routed along the length direction of the wiper arm 12. This thereby enables the one end portion of the main nozzle hose H1 to be connected to the main hose joint 104 without excessively bending the one end side portion of the main nozzle hose H1, which is routed along the length direction of the wiper arm 12, toward the outward movement side of the wiper blade 50. Pressure loss of the cleaning fluid conveyed through the main nozzle hose H1 under pressure can be suppressed as a result.

Moreover, in the main lever 54 of the wiper blade 50, the depression 54C is disposed at the base end side of the wiper blade 50 relative to the protruding portion 54A. Accordingly, in a coupled state of the main lever 54 and the arm piece 40, the main nozzle unit 90 is positioned at a position separated by a predetermined distance toward the base end side from the coupling member 58 (or the arm piece coupling portion 46) provided in the opening 54B of the protruding portion 54A. This thereby enables the cleaning fluid supply section 101 (main nozzle coupler 102) to be disposed in the depression 54C by coupling the coupling member 58 to the arm piece coupling portion 46 (hook 46A) of the arm piece 40.

In the main nozzle unit 90, the cleaning fluid supply section 101 (main nozzle coupler 102) is disposed between the crank portion 44 of the arm piece 40 and the depression 54C of the main lever 54. This thereby enables the cleaning fluid supply section 101 (main nozzle coupler 102) to be covered by the crank portion 44 from the arm upper side (the opposite side from the WS glass G). The crank portion 44 can thus suppress the cleaning fluid supply section 101 (main nozzle coupler 102) from being seen from the arm upper side, and the crank portion 44 is also capable of protecting the cleaning fluid supply section 101 (main nozzle coupler 102) from the arm upper side. This thereby enables the design aesthetic of the vehicle wiper device 10 to be enhanced, and also enables the cleaning fluid supply section 101 to be better protected.

In the main nozzle unit 90, the main nozzle coupler 102 of the cleaning fluid supply section 101 is abutted by the crank portion 44 of the arm piece 40. The main nozzle coupler 102 can thus, for example, be supported by the crank portion 44 even when the wiper blade 50 is displaced relative to the wiper arm 12 at the stand-out position (lock-back position) of the wiper arm 12, and the depression 54C contacts the main nozzle coupler 102. This thereby enables the cleaning fluid supply section 101 to be even better protected.

The crank portion 44 of the arm piece 40 is formed with the hanging wall 48B hanging down toward the WS glass G side with respect to the arm piece 40 at a position on the outward movement side of the wiper blade 50. The main nozzle body 92 of the main nozzle unit 90 is attached to the hanging wall 48B, and the main nozzle body 92 is disposed at the outward movement side of the wiper blade 50 relative to the depression 54C of the wiper blade 50. This thereby enables the main nozzle body 92 that jets cleaning fluid to be disposed close to the WS glass, and the main nozzle body 92 is capable of suppressing the depression 54C from being seen from the outward movement side of the wiper blade 50. The cleaning fluid jetted from the main nozzle body 92 can thus be made to land reliably at the predetermined positions on the WS glass while also enabling the design aesthetic of the vehicle wiper device 10 to be further enhanced.

In the vehicle wiper device 10 configured as described above, a leading end portion of the wiper arm 12 is configured by the arm piece 40, and a length direction intermediate portion of the wiper arm 12 is configured by the retainer 20. A base end portion of the arm piece 40 (the arm piece fixing portion 42) is fixed by the swaged portion 22 formed at the leading end side portion of the retainer 20. Specifically, the swaged portion 22 is configured by the pair of swaged walls 22A and the top wall 20A. The pair of side walls 20B, 20C are bent toward the width direction inner side so as to form the pair of swaged walls 22A. The pair of swaged walls 22A and the top wall 20A fix the arm piece fixing portion 42 in a state in which the piece fixing portion 42 is inserted between the pair of swage walls 22A and the top wall 20A. Since the pair of side walls 20B, 20C of the retainer 20 are employed as the swaged walls 22A, the retainer 20 accordingly has a structure in which the side walls 20B, 20C are not present at the swaged portion 22.

Note that the sub nozzle unit 70 attached to the retainer 20 is disposed at a position facing the swaged walls 22A of the retainer 20. The sub nozzle unit 70 can therefore be attached to the retainer 20 without disposing the side walls 20B, 20C of the retainer 20 on both sides in the width direction of the retainer 20. The side walls 20B, 20C do not face to the first sub nozzle jet opening 82C to the third sub nozzle jet opening 86C. This enables the cleaning fluid jetted from the first sub nozzle jet opening 82C to the third sub nozzle jet opening 86C to be suppressed from being blocked by the side walls 20B, 20C. This thereby enables flexibility when setting the jet directions of the cleaning fluid jetted from the sub nozzle unit 70 to be increased, even when the sub nozzle unit 70 is attached to the retainer 20.

As described above, the sub nozzle unit 70 is disposed at a position facing the swaged walls 22A of the retainer 20.

This thereby enables a space on the WS glass G side of the swaged portion 22 to be effectively utilized to attach the sub nozzle unit 70 to the retainer 20. The sub nozzle unit 70 can thus be attached to the retainer 20 while suppressing an increase in size of the wiper arm 12 in the height direction of the retainer 20 (arm up-down direction). Since the swaged portion 22 is covered by the sub nozzle unit 70 from the WS glass G side, the sub nozzle unit 70 is capable of suppressing the swaged portion 22 from being exposed on the WS glass G side. This thereby enables the design aesthetic of the vehicle wiper device 10 to be enhanced.

As viewed from the arm leading end side, the top wall 20A configuring the swaged portion 22 of the retainer 20 is angled in a direction approaching the WS glass G on progression toward the one side in the width direction of the retainer 20. The sub nozzle unit 70 is accordingly also disposed at an angle with respect to the WS glass G Specifically, as viewed from the arm leading end side, the lower face 70C of the sub nozzle unit 70 is angled in a direction approaching the WS glass G on progression toward the one side in the width direction. Moreover, the first sub nozzle jet opening 82C to the third sub nozzle jet opening 86C of the sub nozzle unit 70 are formed at the corner 70D at the boundary between the side face 70A that is exposed to the one side in the width direction of the retainer 20, and the lower face 70C. The first sub nozzle jet opening 82C to the third sub nozzle jet opening 86C can be thus disposed straddling the side face 70A and the lower face 70C of the sub nozzle unit 70 while also being close to the wiped surface S of the WS glass enabling broader the angle ranges to be set for the first sub nozzle jet opening 82C to the third sub nozzle jet opening 86C, in other words, flexibility when setting the jet directions of the cleaning fluid can be increased than in a theoretical case in which the top wall 20A configuring the swaged portion 22 were to be disposed substantially parallel to the wiped surface S of the WS glass and the first sub nozzle jet opening 82C to the third sub nozzle jet opening 86C were provided to the lower face 70C. The cleaning fluid jetted through the first sub nozzle jet opening 82C to the third sub nozzle jet opening 86C can thus be made to land reliably at predetermined positions relative to the wiper blade 50 that wipes the wiped surface S of the WS glass G.

In the attached state of the sub nozzle unit 70, the leading end side insertion portion 76 is inserted between the side walls 20B, 20C formed with the anchor grooves 20D in the retainer 20, thereby restricting width direction movement of the leading end portion of the sub nozzle unit 70. Moreover, the base end side insertion portion 78 is inserted between the side walls 20B, 20C formed with the anchor holes 20E in the retainer 20, thereby restricting width direction movement of the base end portion of the sub nozzle unit 70. The sub nozzle unit 70 can thereby be attached to the retainer 20 such that the base end portion and the leading end portion of the sub nozzle unit 70 are both supported by the side walls 20B, 20C of the retainer 20. This thereby enables a well-attached state of the sub nozzle unit 70 to be achieved.

The anchor portions 76A of the sub nozzle unit 70 are fitted inside the anchor grooves 20D of the retainer 20, thereby anchoring the leading end portion of the sub nozzle unit 70 to the retainer 20. The anchor portions 76A can thus be anchored to the anchor grooves 20D by fitting the anchor portions 76A of the leading end side insertion portion 76 of the sub nozzle unit 70 into the anchor grooves 20D while inserting the leading end side insertion portion 76 from the arm base end side between the side walls 20B, 20C disposed at the arm leading end side of the swaged portion 22. This thereby enables the leading end portion of the sub nozzle unit 70 to be anchored to the retainer 20 by a simple attachment.

The base end portion of the sub nozzle unit 70 is anchored to the retainer 20 by fitting the first anchor claw 78A and second anchor claw 80C of the sub nozzle unit 70 into the anchor holes 20E of the retainer 20. This thereby enables the first anchor claw 78A and the second anchor claw 80C to be fitted into the anchor holes 20E and anchored as the base end side insertion portion 78 of the sub nozzle unit 70 is being inserted from the open side of the retainer 20 between the side walls 20B, 20C disposed at the arm base end side of the swaged portion 22. This thereby enables the base end portion of the sub nozzle unit 70 to be anchored to the retainer 20 by a simple attachment.

The main nozzle hose H1 is routed through the leading end side hose groove 74A of the sub nozzle unit 70. The sub nozzle unit 70 (hose routing portion 74) can thus prevent the main nozzle hose H1 from being exposed to the exterior of the retainer 20 at the swaged portion 22 where the side walls 20B, 20C of the retainer 20 are not present. Moreover, since the leading end side hose groove 74A is open toward the top wall 20A side of the retainer 20, the top wall 20A is able to close off the opening of the leading end side hose groove 74A. This thereby enables the main nozzle hose H1 to be prevented from projecting toward the WS glass G side through the opening of the retainer 20, while retaining the main nozzle hose H1 with the hose routing portion 74 by attaching the sub nozzle unit 70 to the swaged portion 22.

In the sub nozzle unit 70, the base end side hose groove 81 is formed at the base end side of the leading end side hose groove 74A, and the main nozzle hose H1 is routed through the base end side hose groove 81. The base end side hose groove 81 opens toward the open side of the retainer 20 (the opposite side from the top wall 20A). The leading end side hose groove 74A and the base end side hose groove 81 thereby enable the main nozzle hose H1 to be routed through the sub nozzle unit 70 by being inserted such that the main nozzle hose H1 is sandwiched in the arm up-down direction. This thereby enables the sub nozzle unit 70 to be attached to the retainer 20 in a state in which the main nozzle hose H1 is routed through the leading end side hose groove 74A and through the base end side hose groove 81. This thereby enables the ease of attachment of the sub nozzle unit 70 to be improved.

Moreover, in the present exemplary embodiment, the first sub nozzle 82 to the third sub nozzle 86 of the sub nozzle unit 70 are formed at the corner 70D configuring the boundary between the side face 70A and the lower face 70C. However, the positions of the first sub nozzle 82 to the third sub nozzle 86 may be modified as appropriate. For example, the first sub nozzle 82 to the third sub nozzle 86 may be formed in the side face 70A or in the lower face 70C.

Note that in the present exemplary embodiment, the cleaning fluid supply section 101 of the main nozzle unit 90 is configured by the main nozzle coupler 102 and the main hose joint 104. Alternatively, the cleaning fluid supply section 101 may be configured by the main hose joint 104 only. Namely, for example, in the main nozzle unit 90, the main hose joint 104 may be configured extending from the main nozzle body 92 toward the arm base end side, and the main hose joint 104 may be disposed inside the depression 54C of the wiper blade 50. In such cases, the main nozzle hose H1 connected to the main hose joint 104 can still be prevented or suppressed from interfering with the wiper blade 50 (main lever 54). In other words, the main nozzle hose H1 can be prevented or suppressed from being pinched and deformed between the wiper blade 50 (main lever 54) and the arm piece 40. This thereby enables changes in the jetting pressure of the cleaning fluid jetted through the first main nozzle jet opening 96B to the third main nozzle jet opening 100B of the main nozzle unit 90 to be prevented or suppressed.

In the present exemplary embodiment, a leading end side portion of the top wall 20A of the retainer 20 is inclined at an angle of approximately 45° with respect to the wiped surface S of the WS glass G Alternatively, the entire top wall 20A of the retainer 20 may be disposed substantially parallel to the wiped surface S of the WS glass G.

In the present exemplary embodiment, the hanging wall 48B of the arm piece 40 is bent in a substantially right angle from the leading end portion of the jutting-out wall 48A. Alternatively, the angle of the bend between the jutting-out wall 48A and the hanging wall 48B may be set to an obtuse angle, or may be set to an acute angle.

In the present exemplary embodiment, the attachment wall 48 of the arm piece 40 is configured including the jutting-out wall 48A and the hanging wall 48B. However, the jutting-out wall 48A may be omitted from the attachment wall 48.

In the present exemplary embodiment, the escape hole 48D of the attachment wall 48 of the arm piece 40 is formed spanning from a base end portion of the hanging wall 48B to the jutting-out wall 48A. However, the escape hole 48D may be set to any desired shape. For example, the escape hole 48D may be formed to the base end portion of the hanging wall 48B only.

The disclosures of Japanese Patent Application Nos. 2016-099657, 2016-103528, and 2016-104671 are incorporated in their entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

What is claimed is:

1. A vehicle wiper device comprising:
    a wiper arm formed in an elongated shape, including a base end portion fixed to a pivot shaft and a leading end side portion configured by an arm piece;
    a retainer configuring a length direction intermediate portion of the wiper arm, formed with a recessed profile opening toward a windshield side as viewed along a length direction of the retainer, and including a top wall and a pair of side walls extending from both width direction end portions of the top wall toward the windshield side;
    a fixing portion formed at a leading end side portion of the retainer and fixing a base end portion of the arm piece in a state in which the base end portion of the arm piece is sandwiched by the top wall and a pair of fixing walls formed by bending the pair of side walls toward a width direction inner side; and
    a first nozzle attached to the retainer, disposed facing the pair of fixing walls, and including a jet opening that jets cleaning fluid toward a windshield, wherein:
    the first nozzle includes a leading end side insertion portion configuring a leading end portion of the first nozzle, and a base end side insertion portion configuring a base end portion of the first nozzle;
    the leading end side insertion portion is inserted between the pair of side walls disposed at a leading end side of the wiper arm relative to the fixing portion; and
    the base end side insertion portion is inserted between the pair of side walls disposed at a base end side of the wiper arm relative to the fixing portion.

2. The vehicle wiper device of claim 1, wherein:
    as viewed from a leading end side of the wiper arm, the top wall configuring the fixing portion of the retainer is angled in a direction approaching the windshield on progression toward one side in a width direction of the retainer;
    the first nozzle includes a side face exposed to the one side in the width direction of the retainer, and a lower face exposed to the windshield side; and
    the jet opening is formed at a corner at a boundary between the side face and the lower face.

3. The vehicle wiper device of claim 1, wherein:
    an anchor groove that is open toward the wiper arm base end side is formed at the pair of side walls disposed at the wiper arm leading end side of the fixing portion; and
    an anchor portion that is fitted inside the anchor groove and anchored by the anchor groove is formed at the leading end side insertion portion.

4. The vehicle wiper device of claim 1, wherein:
    an anchor hole is formed at the pair of side walls disposed at the base end side of the wiper arm relative to the fixing portion; and
    an anchor claw that is fitted inside the anchor hole and that is anchored by the anchor hole is formed at the base end side insertion portion.

5. The vehicle wiper device of claim 1, further comprising a second nozzle jetting cleaning fluid toward the windshield and attached to the arm piece; wherein:
    the first nozzle includes:
        a nozzle body configuring a portion at one side in a width direction of the first nozzle and provided with a jet opening, and
        a hose routing portion configuring a portion on another side in the width direction of the first nozzle and including a first hose routing groove through which a hose that supplies cleaning fluid to the second nozzle is routed,
    wherein the first hose routing groove is open toward a top wall side of the retainer.

6. The vehicle wiper device of claim 5, wherein:
    a second hose routing groove through which the hose is routed is formed at the first nozzle at a position at a base end side of the first hose routing groove; and
    the second hose routing groove is open toward an opposite side from the top wall of the retainer.

* * * * *